(12) United States Patent
Uchida

(10) Patent No.: US 9,325,919 B2
(45) Date of Patent: Apr. 26, 2016

(54) IMAGE SENSING APPARATUS

(71) Applicant: CANON KABUSHIKI KAISHA, Tokyo (JP)

(72) Inventor: Mineo Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 13/967,916

(22) Filed: Aug. 15, 2013

(65) Prior Publication Data

US 2014/0055642 A1 Feb. 27, 2014

(30) Foreign Application Priority Data

Aug. 23, 2012 (JP) ................................. 2012-184571
Jun. 4, 2013 (JP) ................................. 2013-118307

(51) Int. Cl.
  *H04N 5/357* (2011.01)
  *H04N 5/378* (2011.01)
(52) U.S. Cl.
  CPC ............. *H04N 5/357* (2013.01); *H04N 5/3575* (2013.01); *H04N 5/378* (2013.01)

(58) Field of Classification Search
  None
  See application file for complete search history.

(56) References Cited

U.S. PATENT DOCUMENTS 7,907,196 B2 * 3/2011 Ogura et al. .................. 348/308

FOREIGN PATENT DOCUMENTS

JP 2009-089367 A 4/2009

\* cited by examiner

*Primary Examiner* — Roberto Velez
*Assistant Examiner* — Angel L Garces-Rivera
(74) *Attorney, Agent, or Firm* — Cowan, Liebowitz & Latman, P.C.

(57) ABSTRACT

An image sensing apparatus comprises an image sensor including a pixel array in which a plurality of pixels are arrayed in matrix, a first storage unit configured to hold an output signal from the pixel, and a second storage unit configured to hold a signal transferred from the first storage unit, wherein signal transfer from the first storage unit to the second storage unit is started during a signal write operation in the first storage unit.

20 Claims, 20 Drawing Sheets

S1: SIGNAL WRITE PERIOD IN FIRST S SIGNAL HOLDING CAPACITOR
N1: SIGNAL WRITE PERIOD IN FIRST N SIGNAL HOLDING CAPACITOR
S2: SIGNAL WRITE PERIOD IN SECOND S SIGNAL HOLDING CAPACITOR
N2: SIGNAL WRITE PERIOD IN SECOND N SIGNAL HOLDING CAPACITOR
HSR: HORIZONTAL SCANNING CIRCUIT OPERATION PERIOD (DATA OUTPUT PERIOD)

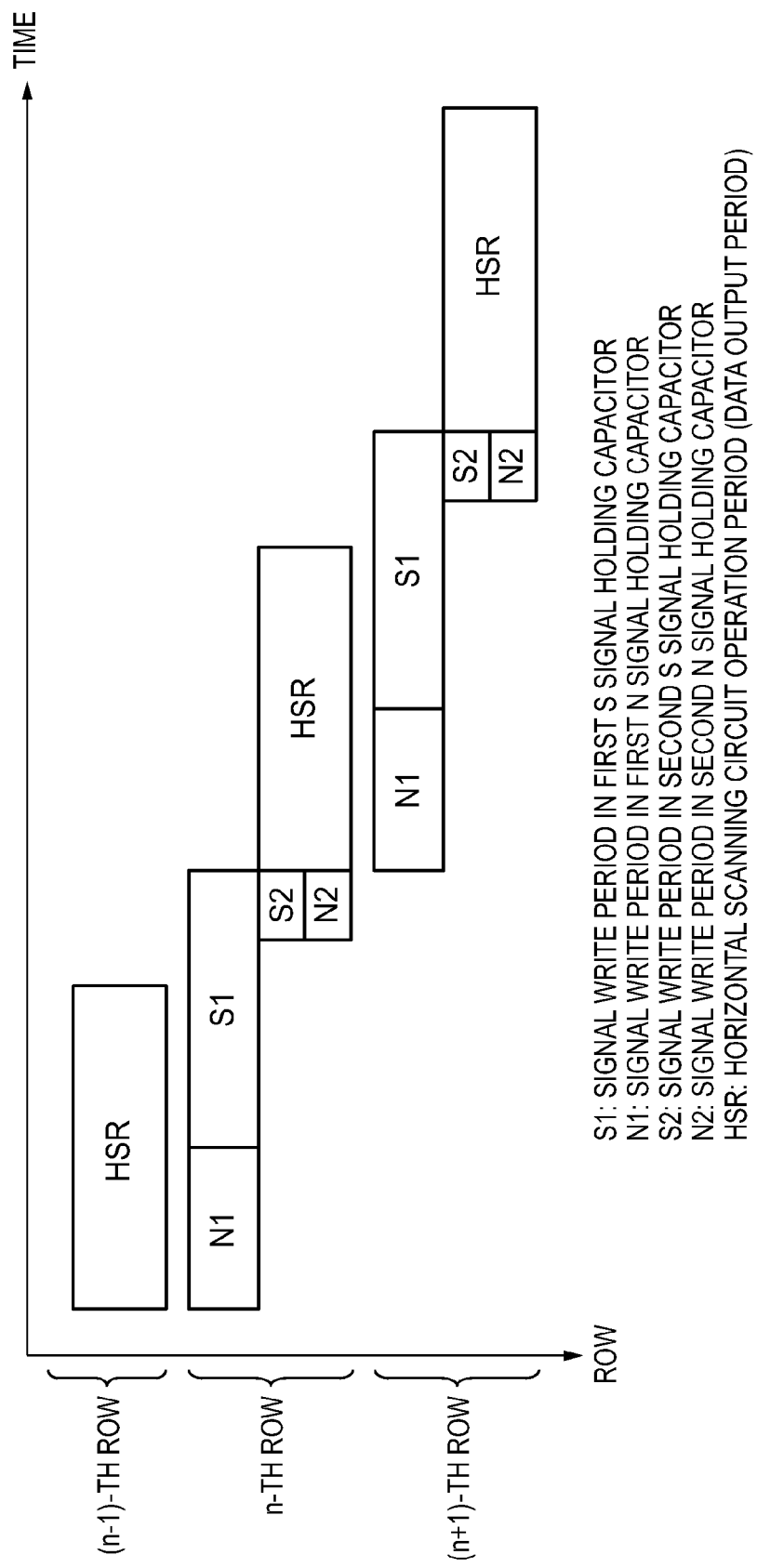

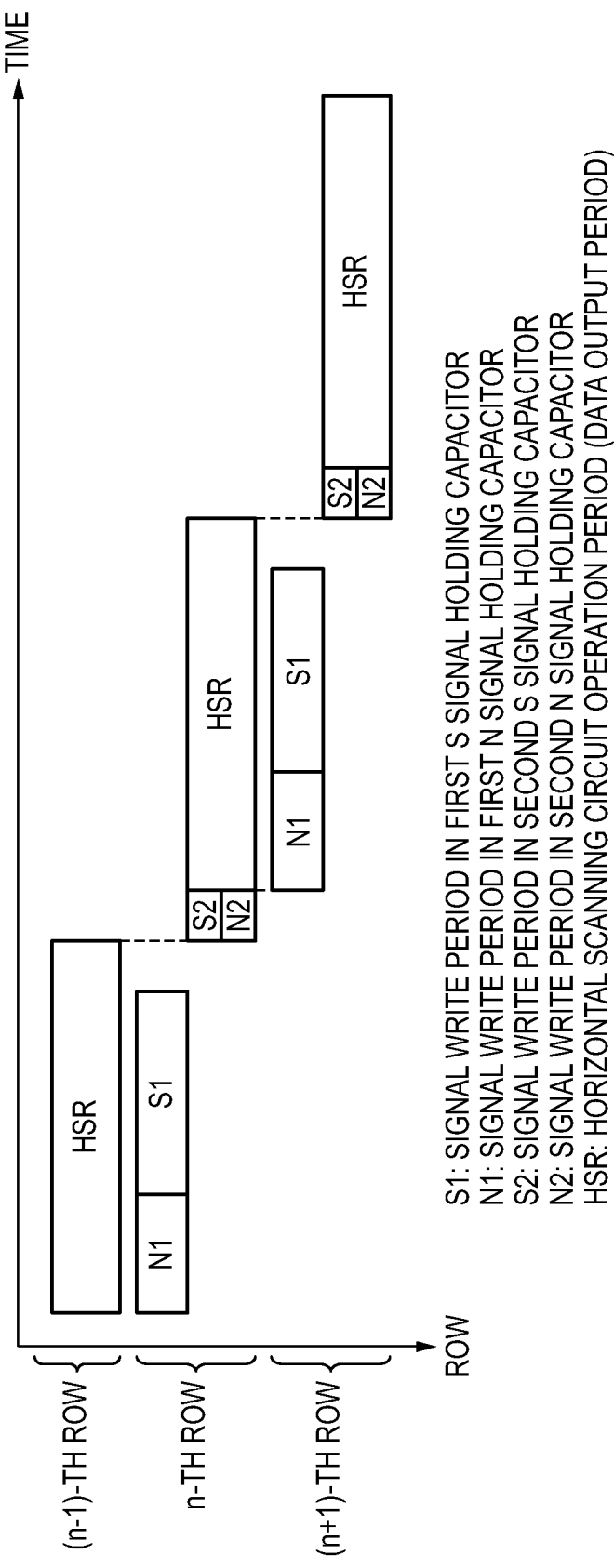

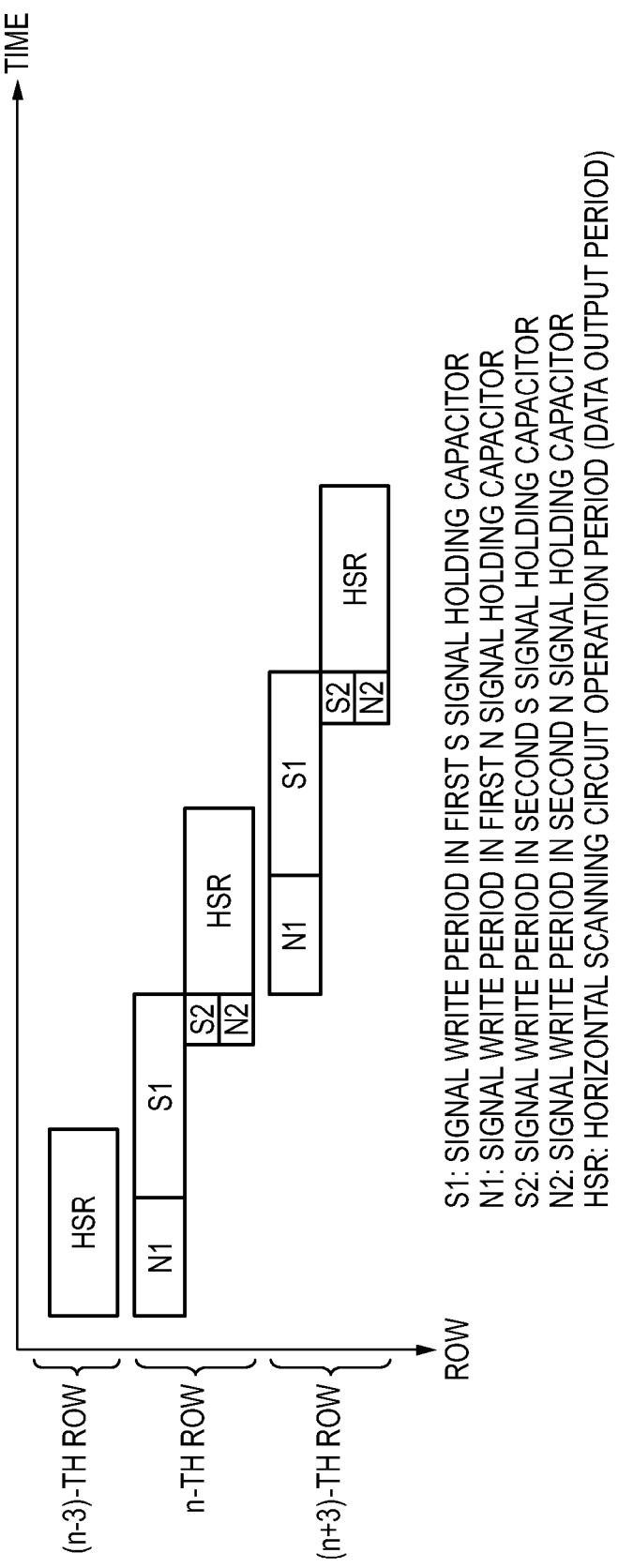

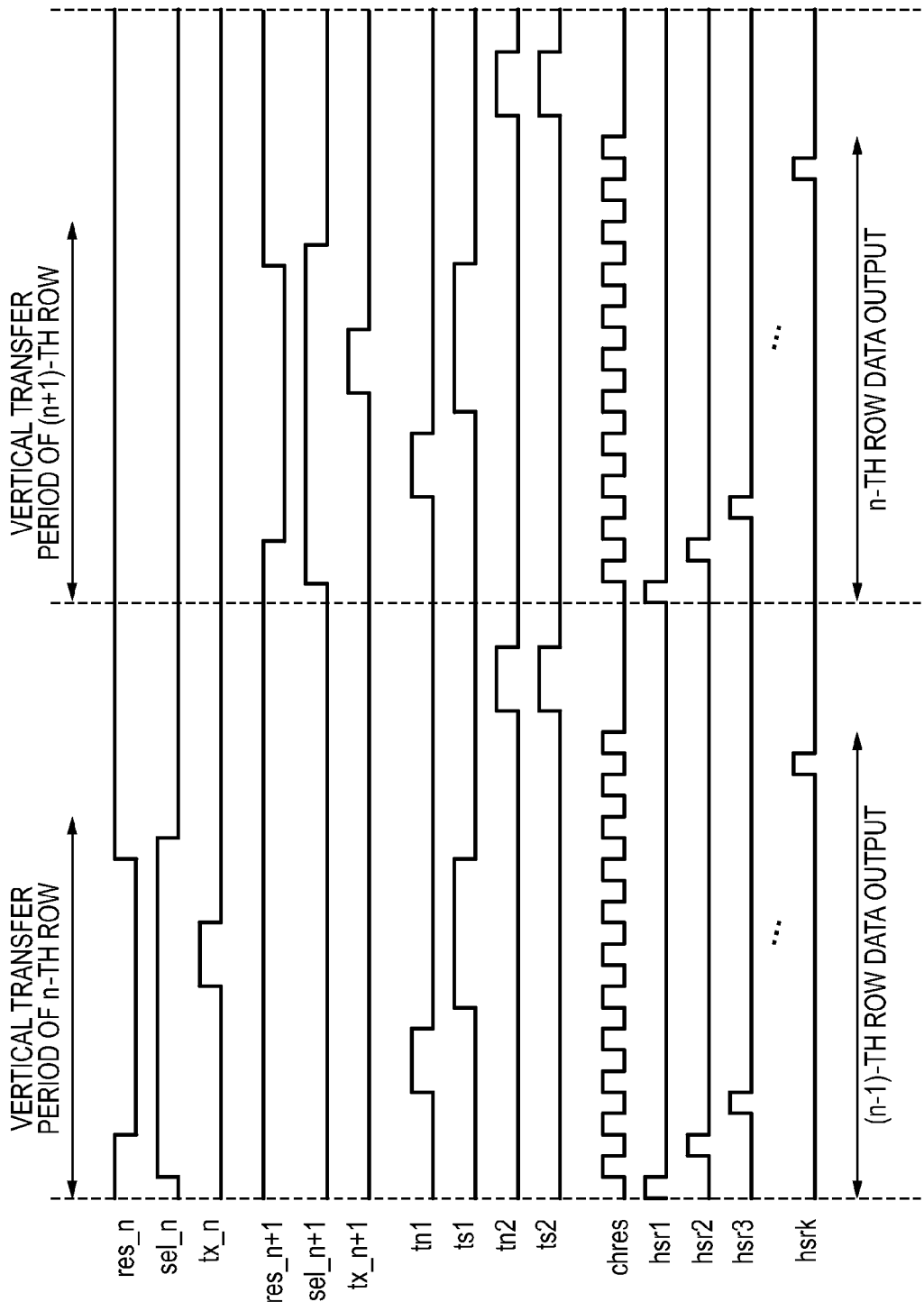

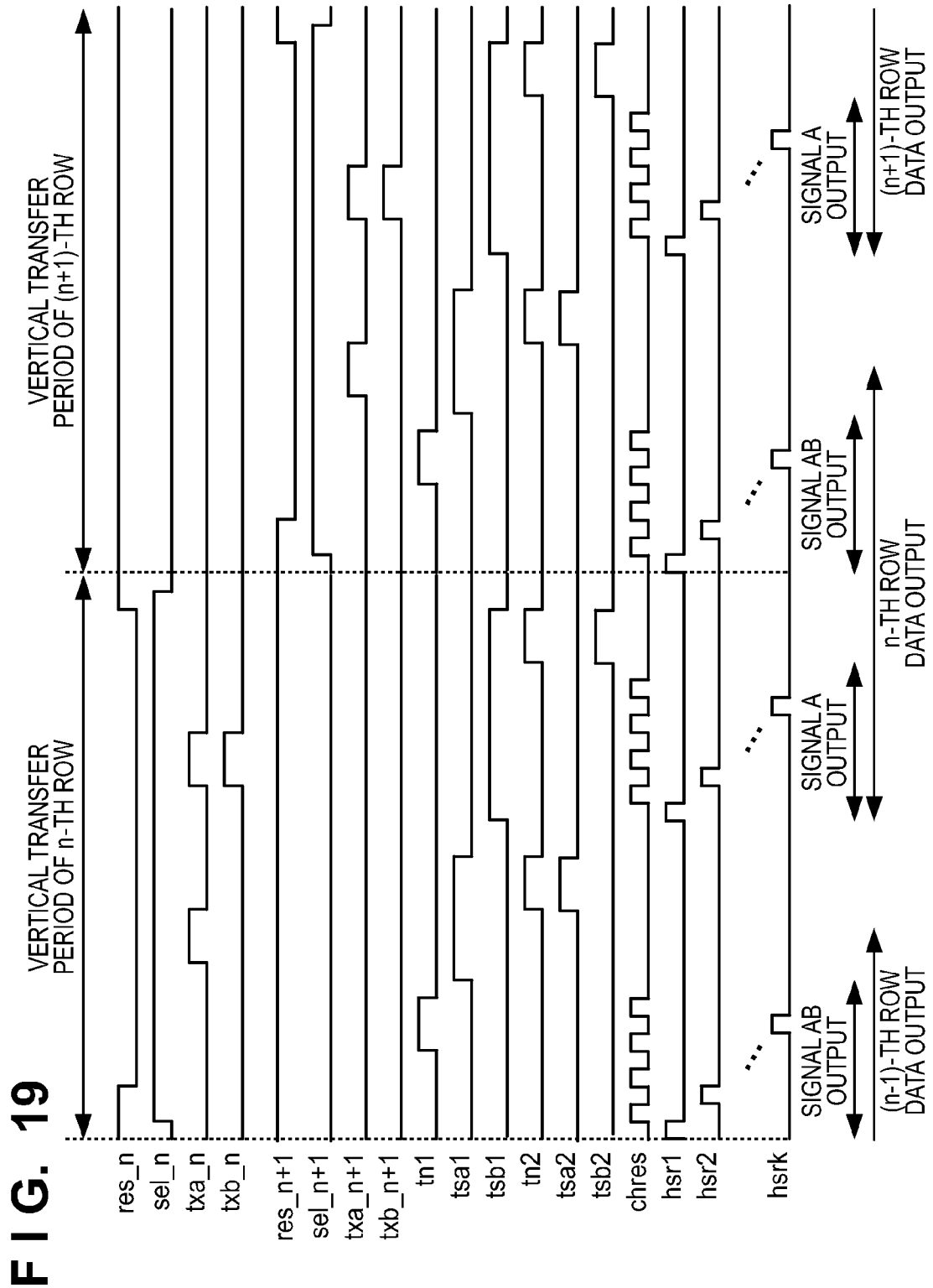

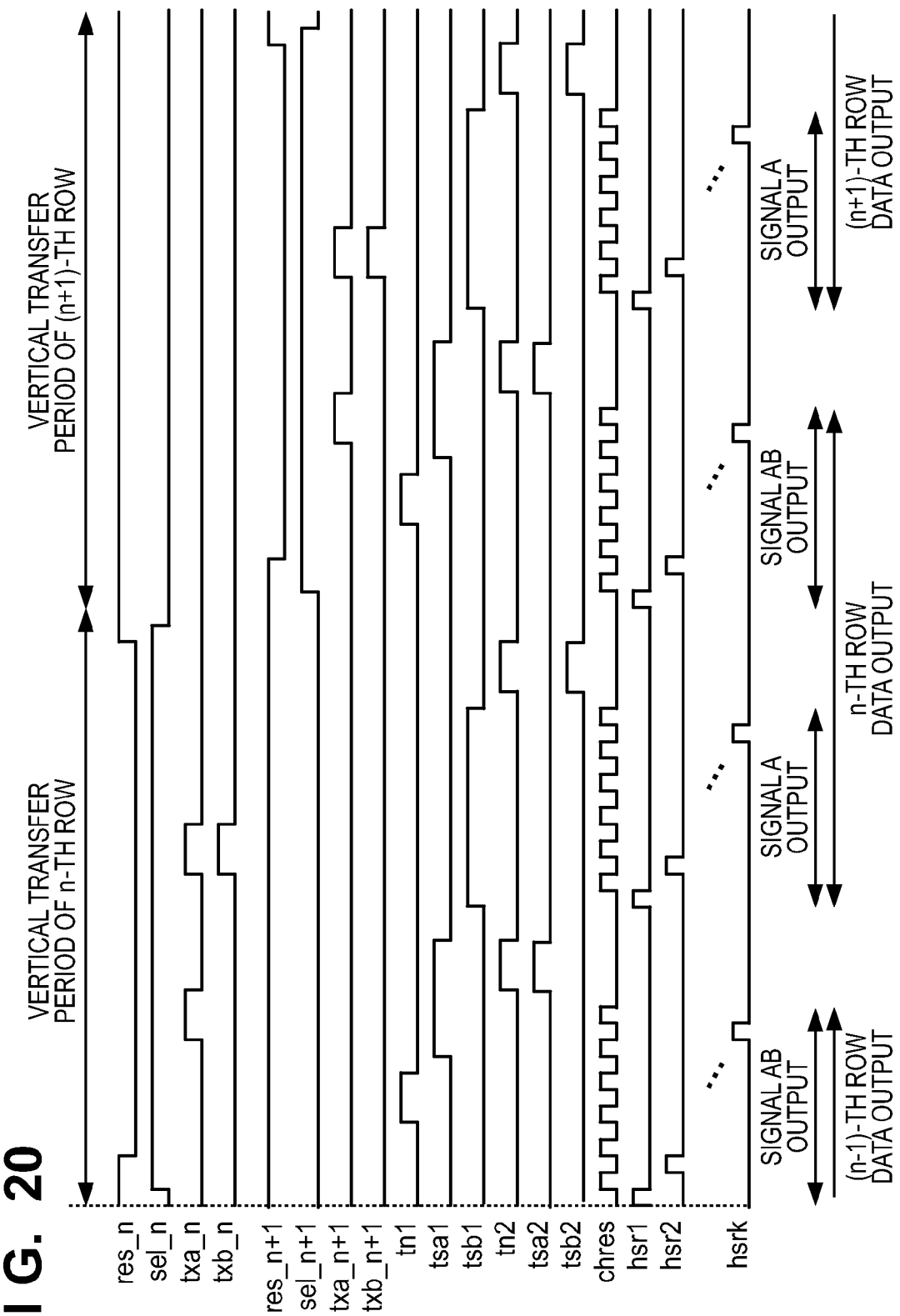

IMAGE SENSING APPARATUS

BACKGROUND OF THE INVENTION

1. Field of the Invention

The present invention relates to a driving method of an image sensor in an image sensing apparatus.

2. Description of the Related Art

In an image sensing apparatus such as a digital camera and video camera, an increase in frame rate of a continuous shooting speed of still images and moving image is demanded. Accordingly, it is required to shorten a signal readout time (total readout time) per frame of an image sensor used in the image sensing apparatus.

Japanese Patent Laid-Open No. 2009-89367 discloses a method of shortening the total readout time by shortening a blanking period (a period in which no signal is output from an image sensor). The arrangement of Japanese Patent Laid-Open No. 2009-89367 includes a first accumulation unit which holds signals output from respective pixel columns, and a second accumulation unit to which a signal in the first accumulation unit is transferred via a transfer unit such as a source-follower amplifier.

In a first period, a signal (that of a first pixel) in the first accumulation unit is transferred to the second accumulation unit. In a subsequent second period, the signal (signal of the first pixel) held in the second accumulation unit is read out to an output unit, and a signal of a next pixel (a signal of a second pixel) is transferred to the first accumulation unit. Thus, the total readout time is shortened.

However, in Japanese Patent Laid-Open No. 2009-89367, the first period (period in which a signal is transferred from the first accumulation unit to the second accumulation unit) is required in addition to the second period, and the total readout time is unnecessarily prolonged by that period.

SUMMARY OF THE INVENTION

The present invention has been made in consideration of the aforementioned problem, and shortens a total readout time by efficiently executing a readout operation of an image sensor, thus attaining a high continuous shooting speed and high frame rate.

According to the first aspect of the present invention, there is provided an image sensing apparatus comprising: an image sensor including a pixel array in which a plurality of pixels are arrayed in matrix, a first storage unit configured to hold an output signal from the pixel, and a second storage unit configured to hold a signal transferred from the first storage unit, wherein signal transfer from the first storage unit to the second storage unit is started during a signal write operation in the first storage unit.

According to the second aspect of the present invention, there is provided an image sensing apparatus comprising: an image sensor including a pixel array in which a plurality of pixels are arrayed in matrix, a first noise signal storage unit configured to hold a noise signal from the pixel, a first light signal storage unit configured to hold a light signal output from the pixel, a second noise signal storage unit configured to hold a signal transferred from the first noise storage unit, and a second light signal storage unit configured to hold a signal transferred from the first light signal storage unit, wherein transfer from the first noise signal storage unit to the second noise signal storage unit is executed after completion of a signal write operation in the first noise signal storage unit, and transfer from the first light signal storage unit to the second light signal storage unit is executed during a signal write operation in the first light signal storage unit.

According to the third aspect of the present invention, there is provided an image sensing apparatus comprising: an image sensor including a pixel array in which a plurality of pixels are arrayed in matrix, a light signal storage unit configured to hold a light signal output from the pixel, a first noise signal storage unit configured to hold a noise signal output from the pixel, and a second noise signal storage unit configured to hold a signal transferred from the first noise signal storage unit, wherein transfer from the first noise signal storage unit to the second noise signal storage unit is executed during a signal write operation in the light signal storage unit after completion of a signal write operation in the first noise signal storage unit.

Further features of the present invention will become apparent from the following description of exemplary embodiments with reference to the attached drawings.

BRIEF DESCRIPTION OF THE DRAWINGS

FIG. 6 is a chart showing a temporal relationship of readout operations according to the first embodiment of the present invention;

FIGS. 8A and 8B are charts showing a temporal relationship of readout operations according to the second embodiment of the present invention;

FIG. 9 is a timing chart showing a readout operation of a still image according to the second embodiment of the present invention;

FIG. 19 is a timing chart for explaining a readout operation according to the fifth embodiment of the present invention; and FIG. 20 is a timing chart for explaining another example of the readout operation according to the fifth embodiment of the present invention.

DESCRIPTION OF THE EMBODIMENTS

Embodiments of the present invention will be described in detail hereinafter with reference to the accompanying drawings.

First Embodiment

Figure 1:
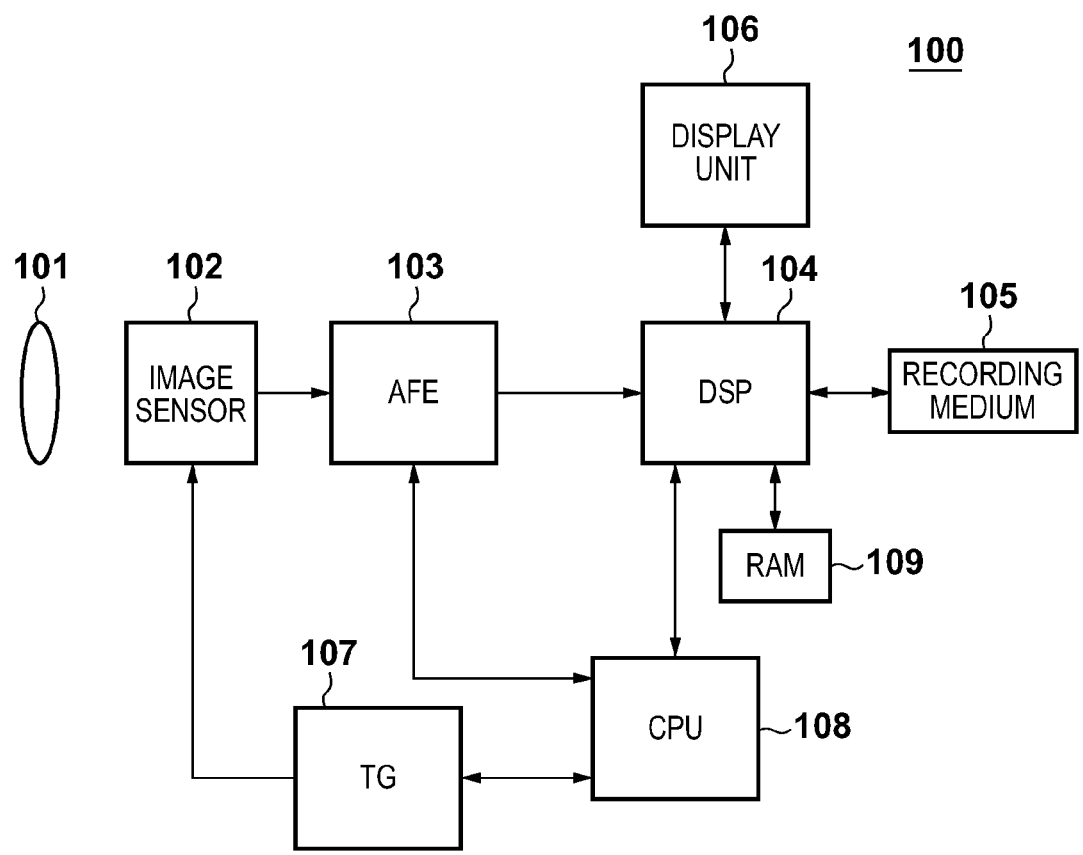
FIG. 1 is a block diagram showing the overall arrangement of an image sensing apparatus according to the first to third embodiments of the present invention.

FIG. 1 is a block diagram showing the overall arrangement of an image sensing apparatus 100 according to the first embodiment of the present invention. An imaging lens 101 images light coming from an object on an image sensor 102. The image sensor 102 photoelectrically converts an object image imaged by the imaging lens 101. In this embodiment, a CMOS image sensor is used as the image sensor 102. The image sensor 102 has a pixel array in which a plurality of pixels are arrayed in matrix. An analog image signal output from the image sensor 102 is converted into a digital signal by an AFE (Analog Front End) 103.

A DSP (Digital Signal Processor) 104 applies various kinds of image processing, compression/decompression processing, and the like to the digital image signal output from the AFE 103. A recording medium 105 records image data processed by the DSP 104. A display unit 106 displays a sensed image processed by the DSP 104, various menu screens, and the like, and uses a liquid crystal display (LCD) or the like.

A timing generator (TG) 107 supplies a driving signal to the image sensor 102. A CPU 108 controls the AFE 103, DSP 104, and TG 107. A RAM 109 temporarily stores image data and the like, and is connected to the DSP 104.

Figure 2:
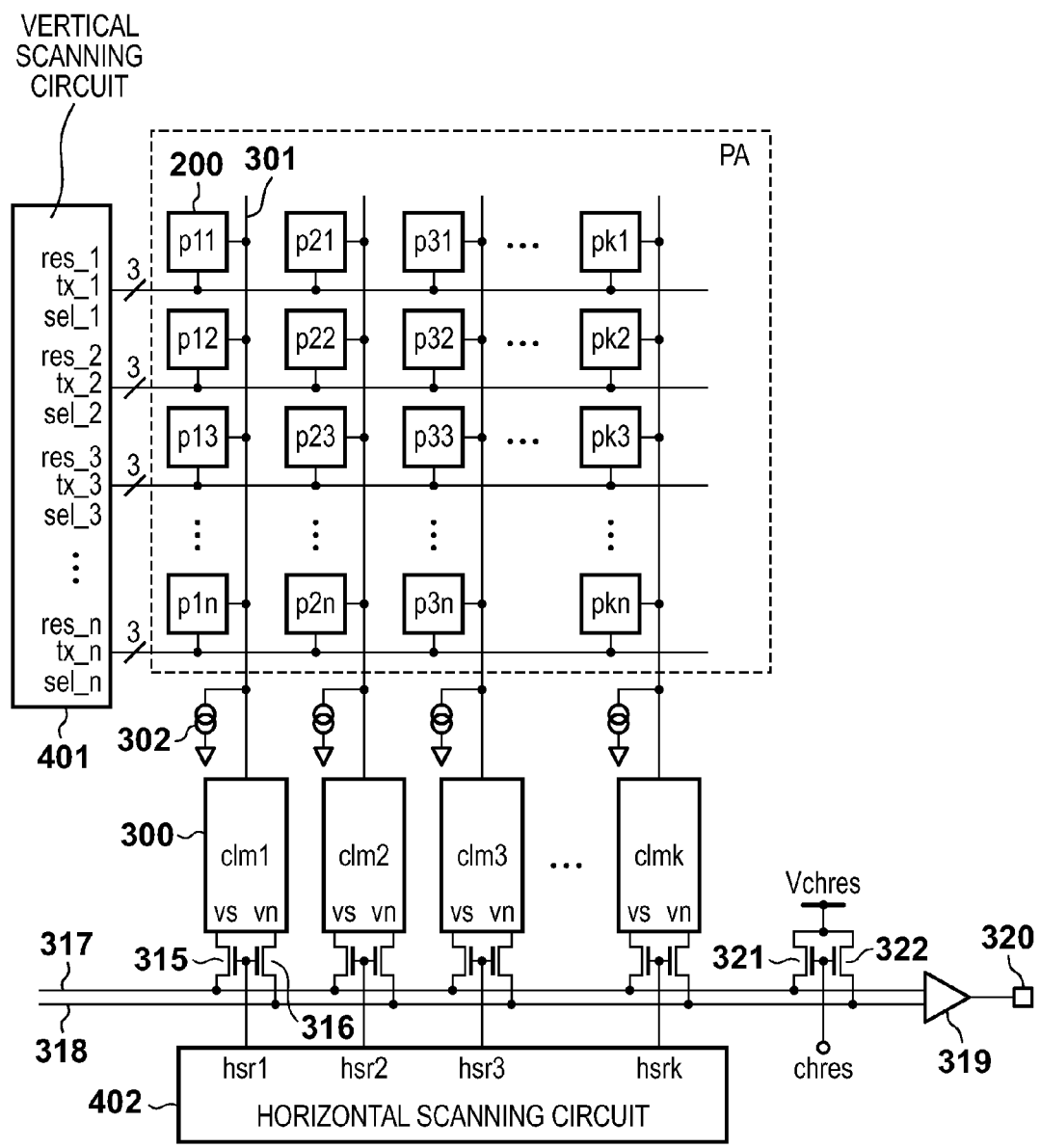
FIG. 2 is a block diagram showing the overall arrangement of an image sensor according to the first to third embodiments of the present invention.

FIG. 2 is a block diagram showing the overall arrangement of the image sensor 102. In a pixel area PA, pixels 200 are arranged in matrix like pixels p11 to pkn.

Figure 3:
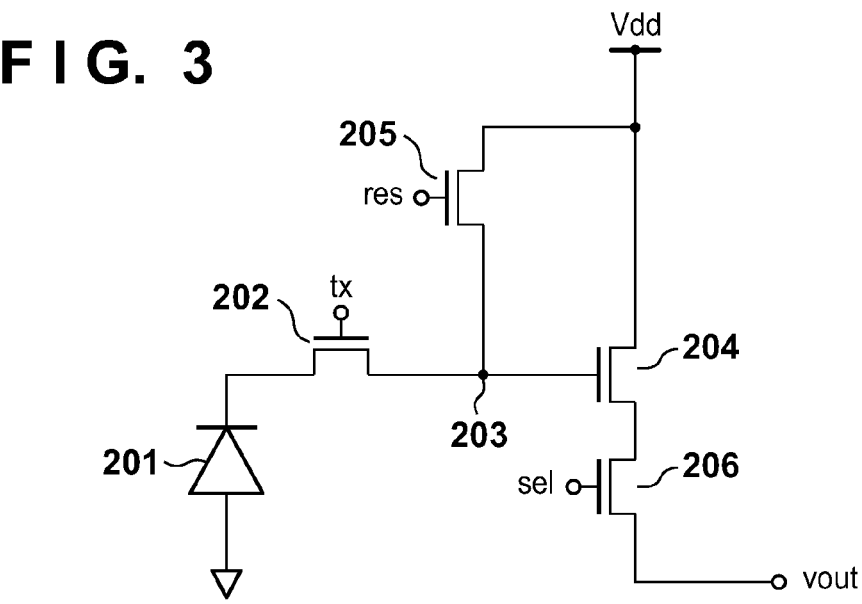
FIG. 3 is a circuit diagram showing the arrangement of one pixel of the image sensor.

The arrangement per pixel of the pixels 200 will be described below with reference to FIG. 3. A photodiode (to be abbreviated as PD hereinafter) 201 photoelectrically converts an incoming light signal, and accumulates a charge according to an exposure amount. When a signal tx is set at High level, a transfer gate 202 is turned on, and the charge accumulated on the PD 201 is transferred to an FD (Floating Diffusion) unit 203. The FD unit 203 is connected to the gate of an amplifier MOS transistor 204, and outputs a voltage signal according to a charge amount transferred from the PD 201 to the FD unit 203.

A reset switch 205 is used to reset a charge on the FD unit 203 and PD 201. When a signal res is set at High level, the reset switch 205 is turned on, and the FD unit 203 is reset. When a charge on the PD 201 is to be reset, both the transfer gate 202 and FD reset switch 205 are turned on by simultaneously setting the signals tx and res at High level, thus resetting the PD 201 via the FD unit 203. A pixel selection switch 206 is turned on by setting a signal sel at High level, and a pixel signal, which is converted into a voltage by the amplifier MOS transistor 204, is output to an output terminal vout of the pixel 200.

Referring back to FIG. 2, a vertical scanning circuit 401 supplies driving signals res_1, tx_1, sel_1, and the like to the respective pixels 200. These driving signals are respectively supplied to terminals res, tx, and sel of the pixels 200. The output terminals vout of the respective pixels are connected to vertical output lines 301 for respective columns, and the vertical output lines 301 of the respective columns are connected to column common readout circuits 300.

Figure 4:
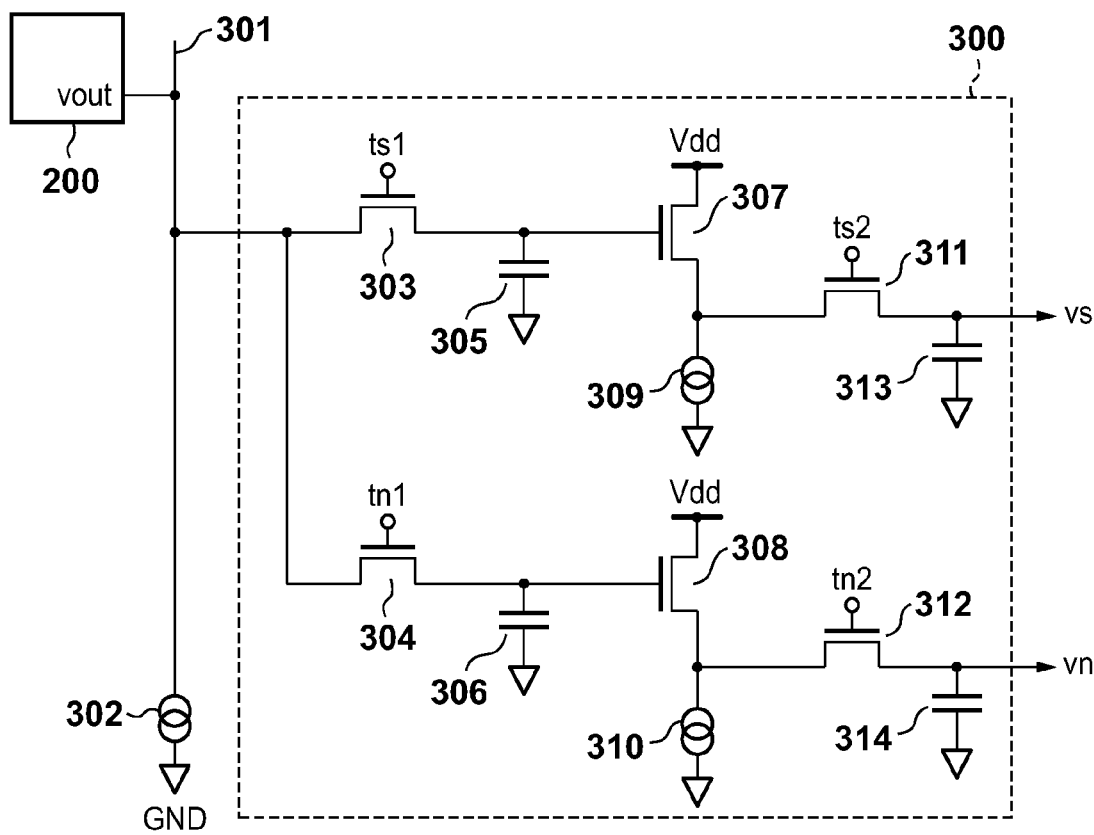
FIG. 4 is a circuit diagram showing the arrangement of a column common readout circuit according to the first, second, and fourth embodiments of the present invention.

The arrangement of each column common readout circuit 300 will be described below with reference to FIG. 4. The vertical output line (column signal line) 301 is arranged for each column, and the output terminals vout of a plurality of pixels 200 for one column are connected to this line. A current source 302 is connected to the vertical output line 301, and this current source 302 and the amplifier MOS transistor 204 of each pixel 200 connected to the vertical output line 301 configure a source-follower circuit.

A first light signal transfer switch 303 is an open/close switch used to transfer a light signal read out from each pixel 200 to a first light signal holding capacitor 305. By setting a signal ts1 at High level, the first light signal transfer switch 303 is turned on. Then, a light signal on the vertical output line 301 is stored in the first light signal holding capacitor 305 via the first light signal transfer switch 303.

A first noise signal transfer switch 304 is an open/close switch used to transfer a noise signal read out from each pixel 200 to a first noise signal holding capacitor 306. By setting a signal tn1 at High level, the first noise signal transfer switch 304 is turned on. Then, a noise signal on the vertical output line 301 is stored in the first noise signal holding capacitor 306 via the first noise signal transfer switch 304.

An NMOS transistor 307 and current source 309 configure a source-follower circuit, and the first light signal holding capacitor 305 is connected to the gate side of the NMOS transistor 307 as an input of the source-follower circuit. Also, the source side of the NMOS transistor 307 as an output of the source-follower circuit is connected to a second light signal transfer switch 311.

The second light signal transfer switch 311 is an open/close switch used to transfer the output of the source-follower circuit to a second light signal holding capacitor 313. By setting a signal ts2 at High level, the second light signal transfer switch 311 is turned on. Then, a signal according to a signal amount held in the first light signal holding capacitor 305 is stored in the second light signal holding capacitor 313 via the second light signal transfer switch 311.

An NMOS transistor 308 and current source 310 configure a source-follower circuit, and the first noise signal holding capacitor 306 is connected to the gate side of the NMOS transistor 308 as an input of the source-follower circuit. The source side of the NMOS transistor 308 as an output of the source-follower circuit is connected to a second noise signal transfer switch 312.

The second noise signal transfer switch 312 is an open/close switch used to transfer the output of the source-follower circuit to a second noise signal holding capacitor 314. By setting a signal tn2 at High level, the second noise signal transfer switch 312 is turned on. Then, a signal according to a signal amount held in the first noise signal holding capacitor 306 is stored in the second noise signal holding capacitor 314 via the second noise signal transfer switch 312.

The second light signal holding capacitor 313 and second noise signal holding capacitor 314 are respectively connected to output terminals vs and vn of the column common readout circuit 300.

Referring back to FIG. 2, horizontal transfer switches 315 and 316 are respectively connected to the output terminals vs and vn of each column common readout circuit 300. The horizontal transfer switches 315 and 316 are controlled by a control signal hsr* (* is a column number) of a horizontal scanning circuit 402. Then, when the control signal hsr* goes to High level, the horizontal transfer switches 315 and 316 are turned on, and the signals of the second light signal holding capacitor 313 and second noise signal holding capacitor 314 are respectively transferred onto a horizontal output lines 317 and 318.

The horizontal output lines 317 and 318 are connected to inputs of a differential amplifier 319, which calculates a difference between the light signal and noise signal and multiplies the difference by a predetermined gain at the same time, thus outputting a final image signal to an output terminal 320. Horizontal output line reset switches 321 and 322 are turned on (closed state) when a signal chres goes High, and the horizontal output lines 317 and 318 are reset to a reset voltage Vchres.

Figure 5:
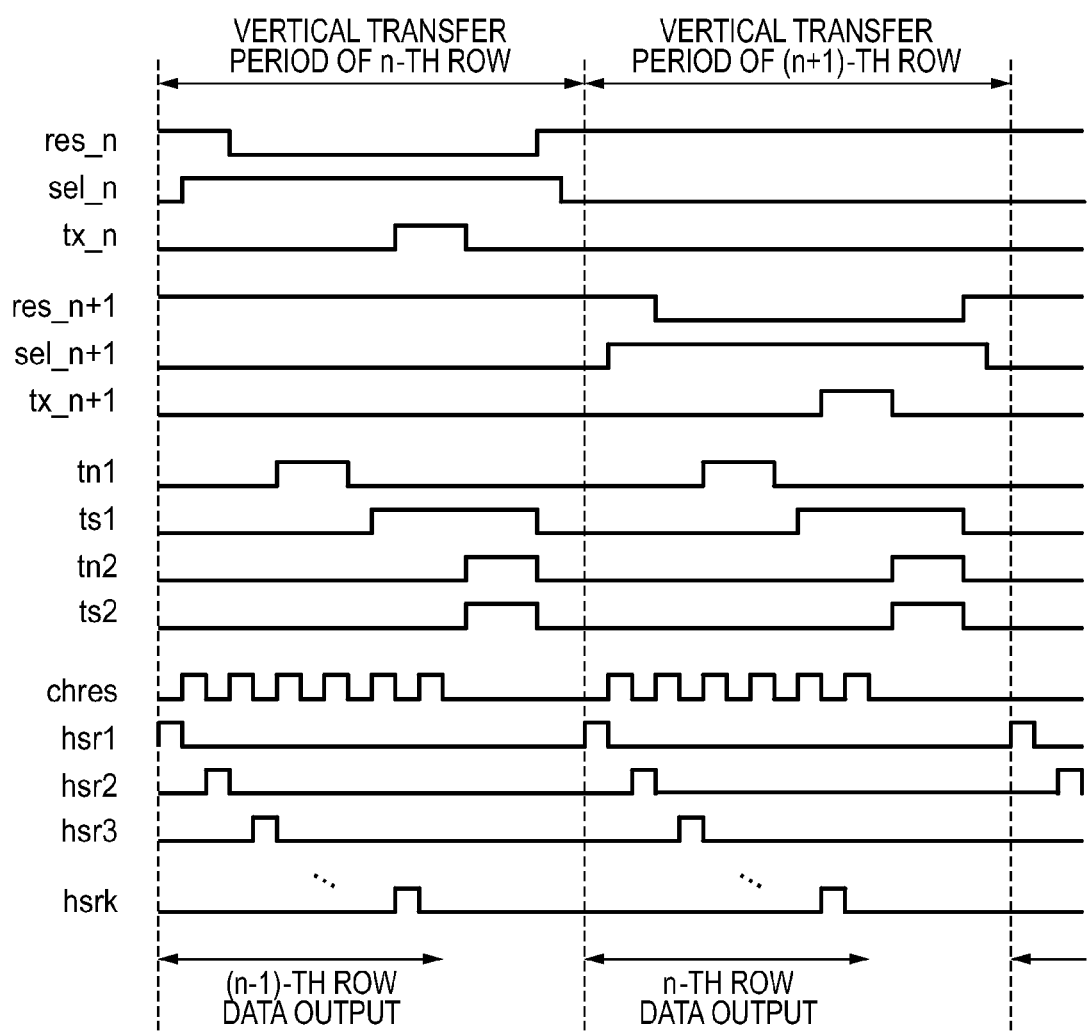
FIG. 5 is a timing chart showing a readout operation according to the first embodiment of the present invention.

A readout operation of the image sensor 102 will be described below with reference to FIG. 5. FIG. 5 is a timing chart showing readout operations of respective rows of the image sensor 102.

Initially, a signal sel_n is set at High level to turn on the pixel selection switches 206 of the pixels of the n-th row. After that, a signal res_n is set at Low level to turn off the reset switches 205 (open state), thus releasing the reset state of the FD units 203.

Next, the signal tn1 is set at high level to turn on the first noise signal transfer switches 304, thereby storing noise signals in the first noise signal holding capacitor 306. Subsequently, the signal tn1 is set at Low level to turn off the first noise signal transfer switches 304. Then, the signal ts1 is set at High level to turn on the first light signal transfer switches 303. Also, a signal tx_n is set at High level to turn on the transfer gates 202.

With these operations, signals according to charges accumulated on the PDs 201 of the selected n-th row are output onto the vertical output lines 301 via the amplifier MOS transistor 204 and pixel selection switches 206, and are further stored in the first light signal holding capacitors 305 via the first light signal transfer switches 303.

Next, signals tx_n and ts1 are set at Low level to turn off the transfer gates 202 and light signal transfer switches 303, and a signal res_n is then set at High level to turn on the reset switches 205, thus resetting the FD units 203.

With the operations executed so far, operations for storing the noise signals and light signals of the n-th row in the first light signal holding capacitors 305 and first noise signal holding capacitors 306 are complete. For the sake of descriptive convenience, the operations executed so far will be referred to as vertical transfer operations hereinafter, and a period in which the vertical transfer operations are executed will be referred to as a vertical transfer period hereinafter.

During the vertical transfer period of the n-th row, operations for outputting light signals and noise signals of the (n−1)-th row from the image sensor 102, which were accumulated in the second light signal holding capacitors 313 and second noise signal holding capacitors 314 before that period, are executed.

Initially, when a control signal hsr1 of the horizontal scanning circuit 402 goes to High level, the horizontal transfer switches 315 and 316 are turned on. Then, the light signal and noise signal of the (n−1)-th row held in the second light signal holding capacitor 313 and second noise signal holding capacitor 314 are output to the output terminal 320 via the horizontal output lines 317 and 318 and differential amplifier 319. The horizontal scanning circuit 402 outputs image signals of all columns of the (n−1)-th row by setting control signals hsr1, hsr2, . . . , hsrk of the respective columns at High level in turn.

Note that while the signals of the respective columns are read out in response to the control signals hsr1 to hsrk, the signal chres is set at High level to turn on the horizontal output line reset switches 321 and 322, thereby temporarily resetting the horizontal output lines 317 and 318 to the level of the reset voltage Vchres.

After completion of the output operations of the image signals of the (n−1)-th row, the signal tn2 is set at High level to turn on the second noise signal transfer switches 312. Thus, signals according to noise signals of the n-th row held in the first noise signal holding capacitors 306 are held in the second noise signal holding capacitors 314.

In the same manner as the signal tn2, the signal ts2 is also set at High level to turn on the second light signal transfer switches 311. At this time, although the first light signal transfer switches 303 are still ON, and signals are being written in the first light signal holding capacitors 305, light signals are simultaneously written in the second light signal holding capacitors 313 via the source-follower circuits each including the NMOS transistor 307 and current source 309 and the second light signal transfer switches 311.

In this manner, since the need for assuring a signal write time in the second light signal holding capacitors 313 and second noise signal holding capacitors 314 independently of other operation times can be obviated, a total readout time can be shortened.

FIG. 6 shows the temporal relationship of the aforementioned readout operations more simply. A period N1 indicates a signal write period in the first noise signal holding capacitors 306, that is, an ON period of the first noise signal transfer switches 304. A period S1 indicates a signal write period in the first light signal holding capacitors 305, that is, an ON period of the first light signal transfer switches 303. Also, a period N2 indicates a signal write period in the second noise signal holding capacitors 314, that is, an ON period of the second noise signal transfer switches 316. A period S2 indicates a signal write period in the second light signal holding capacitors 313, that is, an ON period of the second light signal transfer switches 311. A period HSR indicates a period in which the horizontal scanning circuit 402 operates to output image signals for one row from the output terminal 320.

As can be seen from FIG. 6, the period S1 includes the periods S2 and N2, and overall readout operations can be efficiently executed.

Note that in this embodiment, after the first light signal transfer switches 303 are turned on, the second light signal transfer switches 311 are turned on later. However, when the output operations of image signals of the previous row are complete by the horizontal scanning circuit 402, both the switches may be simultaneously turned on. Alternatively, the second light signal transfer switches 311 may be turned on prior to the first light signal transfer switches 303.

In this embodiment, the first and second light signal transfer switches 303 and 311 are simultaneously turned off. However, the present invention is not limited to this, and these switches may be turned off at different timings.

Figure 7A:
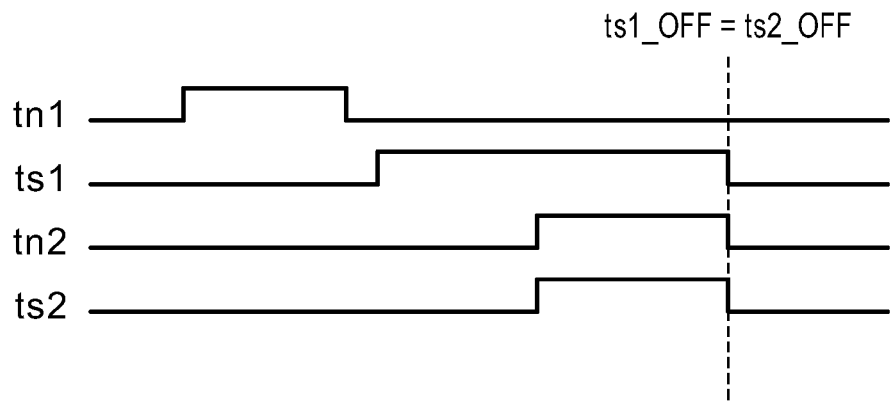
FIGS. 7A to 7C are timing charts showing the readout operation according to the first embodiment of the present invention.
Figure 7B:
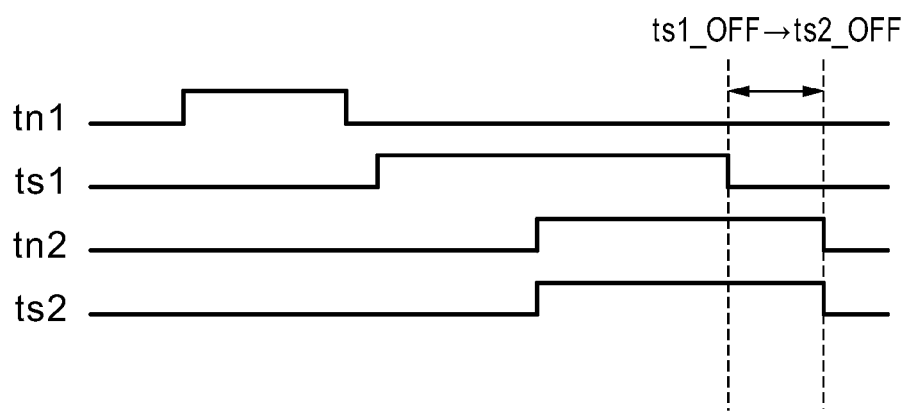
Figure 7C:
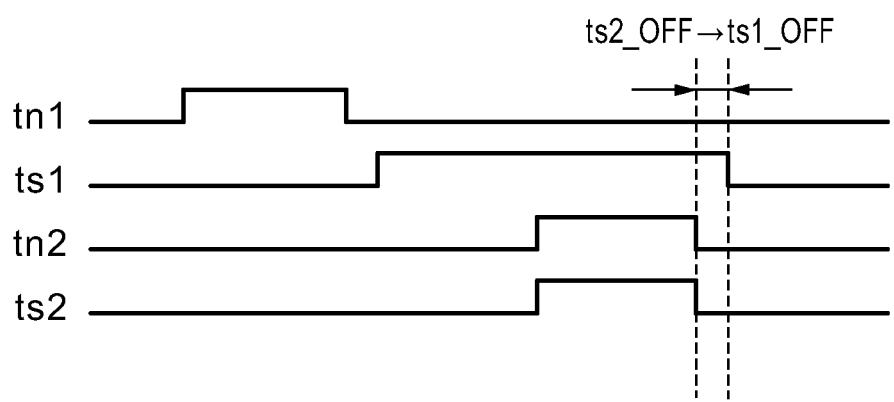

FIGS. 7A to 7C are timing charts showing the operations of the first light signal transfer switch 303, second light signal transfer switch 311, first noise signal transfer switch 304, and second noise signal transfer switch 316 of this embodiment. In FIG. 7A, the first and second light signal transfer switches 303 and 311 are simultaneously turned off. In this case, the first light signal transfer switch 303 is ON immediately before a timing at which a signal of the second light signal holding capacitor 313 is settled, that is, an OFF timing of the second light signal transfer switch 311. On the other hand, on the noise signal side, the first noise signal holding capacitor 304 is already turned off at a timing at which a signal of the second noise signal holding capacitor 314 is settled, that is, an OFF timing of the second noise signal transfer switch 316. This timing difference may cause a slight difference between a light signal and noise signal. On the noise signal side, when the first noise signal transfer switch 304 is turned off, some charge components under the transfer gate are discharged toward the first noise signal holding capacitor 306 side, and are superposed on a noise signal to be held in the first noise signal holding capacitor 306. On the other hand, on the light signal side, since the second light signal transfer switch 311 is turned off before a charge under the transfer gate of the first light signal transfer switch 303 is discharged, such components are not superposed. Although this difference is slight, it cannot be canceled even by calculating a difference between the light signal and noise signal by the differential amplifier 319.

By contrast, FIG. 7B is a timing chart when the first light signal transfer switch 303 is turned off before the second light signal transfer switch 311. On the light signal side as well, the first light signal transfer switch 303 is turned off before a timing at which a signal of the second light signal holding capacitor 313 is settled, and the same state as in the noise signal side is set. Hence, the aforementioned difference is not generated between a light signal and noise signal. However, since a signal line potential varies when the first light signal transfer switch 303 is turned off, a stabilization wait time of this variation has to be assured until the second light signal transfer switch 311 is turned off. Therefore, an effect of shortening the total readout time is deteriorated by this stabilization wait time.

On the other hand, FIG. 7C is a timing chart when the second light signal transfer switch 311 is turned off before an OFF timing of the first light signal transfer switch 303. When these switches are simultaneously turned off as in FIG. 7A, there is a possibility that the first light signal transfer switch 303 may be turned off earlier due to a slight delay difference between the signals ts1 and ts2, and a potential variation of a signal line may influence a signal held in the second light signal holding capacitor 311. When the second light signal transfer switch 311 is turned off earlier, as shown in FIG. 7C, such possibility can be surely removed. Note that in this embodiment, an arrangement which does not include any first light signal holding capacitor 305 may be adopted. In this case, the control may be made to transfer a noise signal from the first noise signal holding capacitor 306 to the second noise signal holding capacitor 314 after completion of a signal write operation in the first noise signal holding capacitor 306 and during a write operation of a light signal in the second light signal holding capacitor 313.

Second Embodiment

The first embodiment is premised on that the end of the period HSR is earlier than that of the period S1, as shown in FIG. 6. That is, the output operations of image signals of the (n−1)-th row are complete before completion of write operations of signals of the n-th row in the first light signal holding capacitor 305.

However, when the number of pixels, signals of which are to be read out from the image sensor 102, is large, the period HSR is prolonged, and the end of the period HSR is often later than that of the period S1. Especially, in a camera having a setting unit which allows the user to set one of a still image mode and moving image mode as an imaging mode, the period HSR often becomes long in the still image mode since all pixels of the image sensor 102 are read out, and it often becomes short in the moving image mode since the number of pixels to be read out is reduced due to decimation or the like. This embodiment will explain a case in which the period HSR has different durations depending on modes, as described above.

Since the overall arrangement of the image sensing apparatus and the arrangement of the image sensor are the same as those of the first embodiment, a description thereof will not be repeated.

FIG. 8A is a chart showing readout operations in the still image mode. In the still image mode, since signals of all pixels of the image sensor 102 are read out, the period HSR is prolonged, and the period HSR of the previous row does not end even after the period S1 ends. For this reason, the write operation in the second light signal holding capacitor 314 and that in the second noise signal holding capacitor 316, which are to be executed during the period S2, cannot be started, and are executed after the end of the period HSR.

FIG. 9 is a timing chart showing readout operations in the still image mode. After the control signal hsrk, that is, a column selection signal of the last column goes to High level to read out image signals of the last columns, the signals tn2 and ts2 are set at High level to turn on the second noise signal transfer switch 312 and second light signal transfer switch 311.

Next, FIG. 8B is a chart showing readout operations in the moving image mode. In the moving image mode, assume that pixel signals of the image sensor 102 are read out after being decimated to ⅓ in both horizontal and vertical directions. This decimation readout operation is attained by scanning the vertical scanning circuit 401 and horizontal scanning circuit 402 every third row and every third column. Since pixels in the horizontal direction are decimated, the period HSR is shortened, and the period HSR of the previous row ends in the middle of the period S1 in the same manner as the description of the first embodiment. After the end of the period HSR of the previous row, the write operation in the second light signal holding capacitor 314 of the period S2 and that in the second noise signal holding capacitor 316 of the period N2 are executed during the period S1, thus shortening the total readout time. Hence, a moving image at a higher frame rate can be captured.

Figure 10:
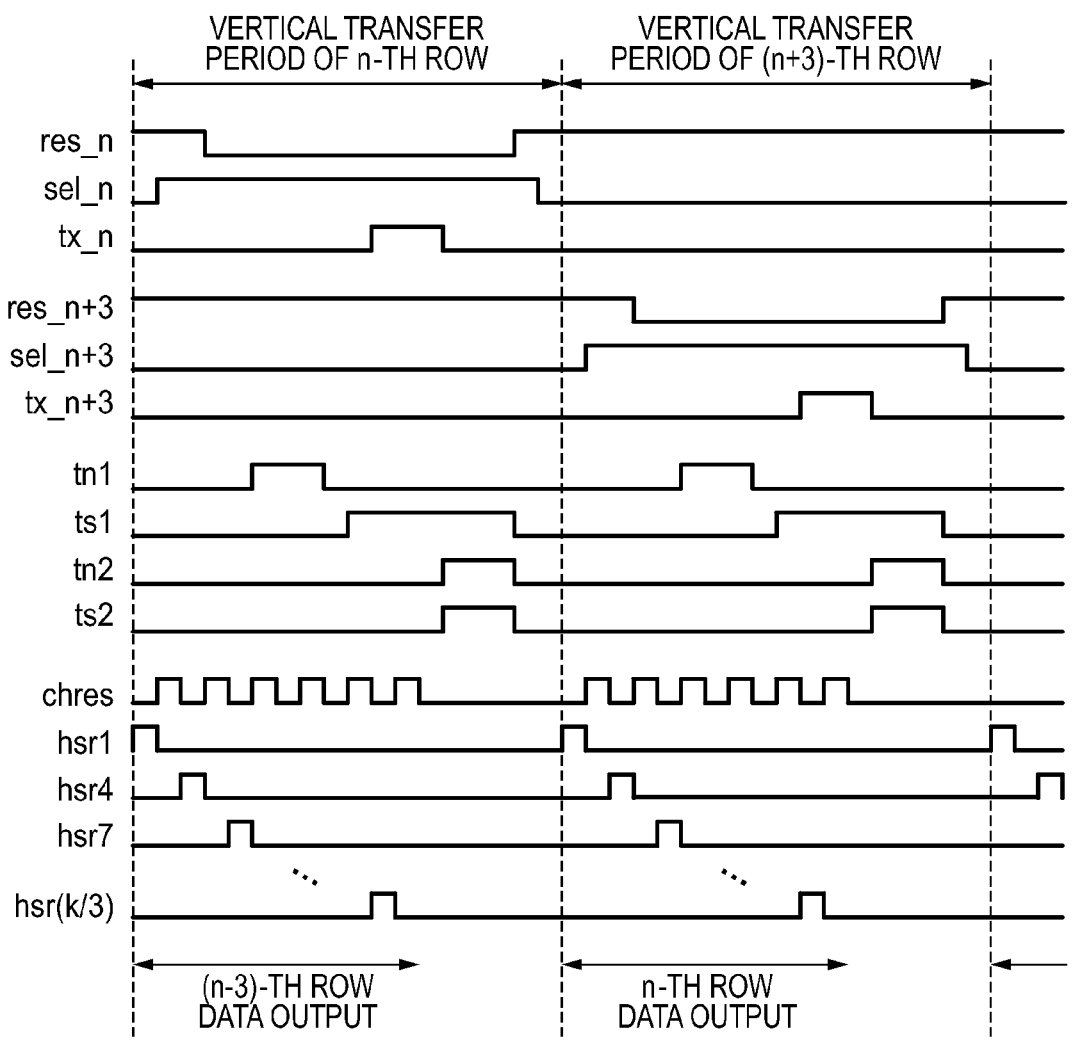
FIG. 10 is a timing chart showing a readout operation of a moving image according to the second embodiment of the present invention.

FIG. 10 is a timing chart showing readout operations in the moving image mode. The timing chart shown in FIG. 10 is the same as that in FIG. 5. However, since the vertical scanning circuit 401 is scanned every third row, signal transfer of the (n+3)-th row is executed using signals res_n+3, sel_n+3, and tx_n+3 after the vertical transfer period of the n-th row using signals res_n, sel_n, and tx_n. Although not shown, signals res, sel, and tx of rows to be decimated ((n+1)-th row and (n+2)-th row) are kept fixed at Low level. Also, since the horizontal scanning circuit 402 is scanned every third column, outputs of the horizontal scanning circuit 402 go to High in an order of selection signals hsr1, hsr4, hsr7, . . . . Although not shown, selection signals hsr2, hsr3, hsr5, hsr6, . . . of columns to be decimated are fixed at Low level.

As described above, in the still image mode which requires the long period HSR, the operations of the periods S2 and N2 are executed in wait for the end of the period HSR of the previous row after the end of the period S1. In the moving image mode which requires the short period HSR, the operations of the periods S2 and N2 are executed during the period S1. In this way, a higher frame rate can be achieved in the moving image mode.

Third Embodiment

Figure 11:
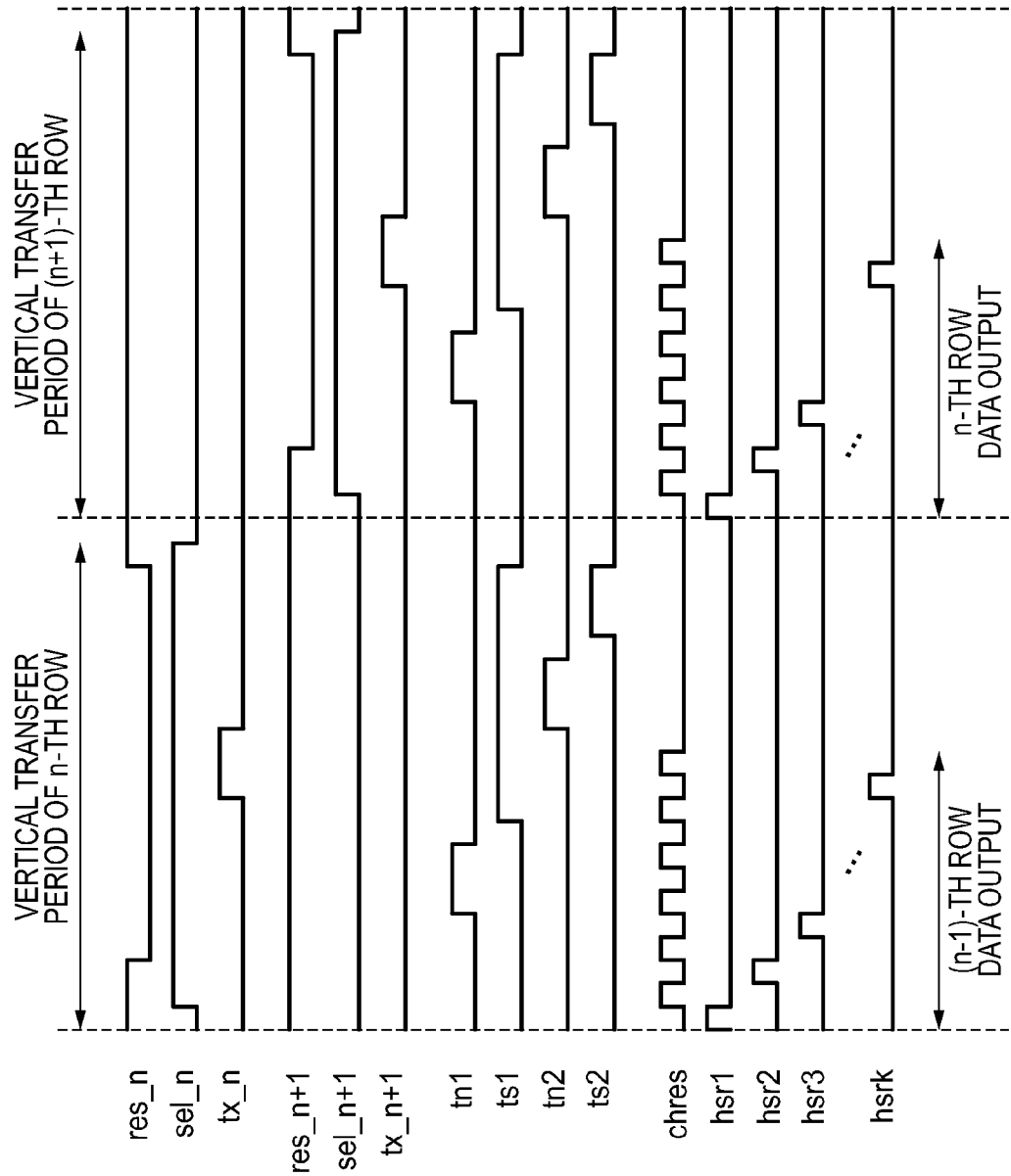
FIG. 11 is a timing chart showing a readout operation according to the third embodiment of the present invention.
Figure 12:
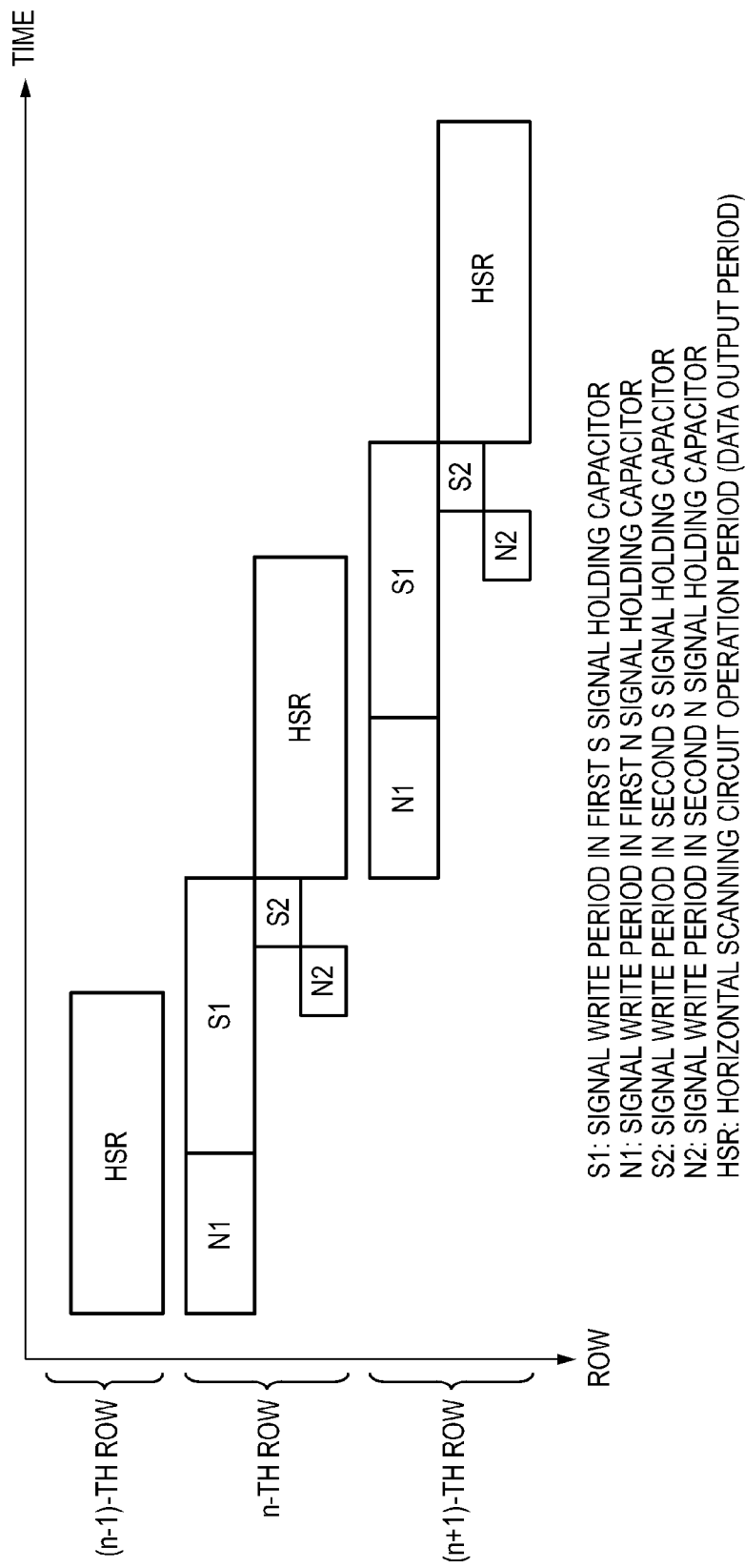
FIG. 12 is a chart showing a temporal relationship of readout operations according to the third embodiment of the present invention.

In the first embodiment, the second light signal transfer switch 311 and second noise signal transfer switch 312 are simultaneously turned on, but they can be turned on at different timings. FIG. 11 is a timing chart in this case. Initially, the signal tn2 is set at High level to execute a signal write operation in the second noise signal holding capacitor 314 after the output of an image signal using the outputs hsr1 to hsrk from the horizontal scanning circuit 402 is complete. Next, the signal ts2 is set at High level to execute a signal write operation in the second light signal holding capacitor 313. FIG. 12 shows a temporal relationship of readout operations. In this case, since the periods N2 and S2 are set at different times, the number of source-follower circuits in the column common readout circuit 300 can be reduced to one, and that source-follower circuit can be shared by the light signal side and the noise signal side.

Figure 13:
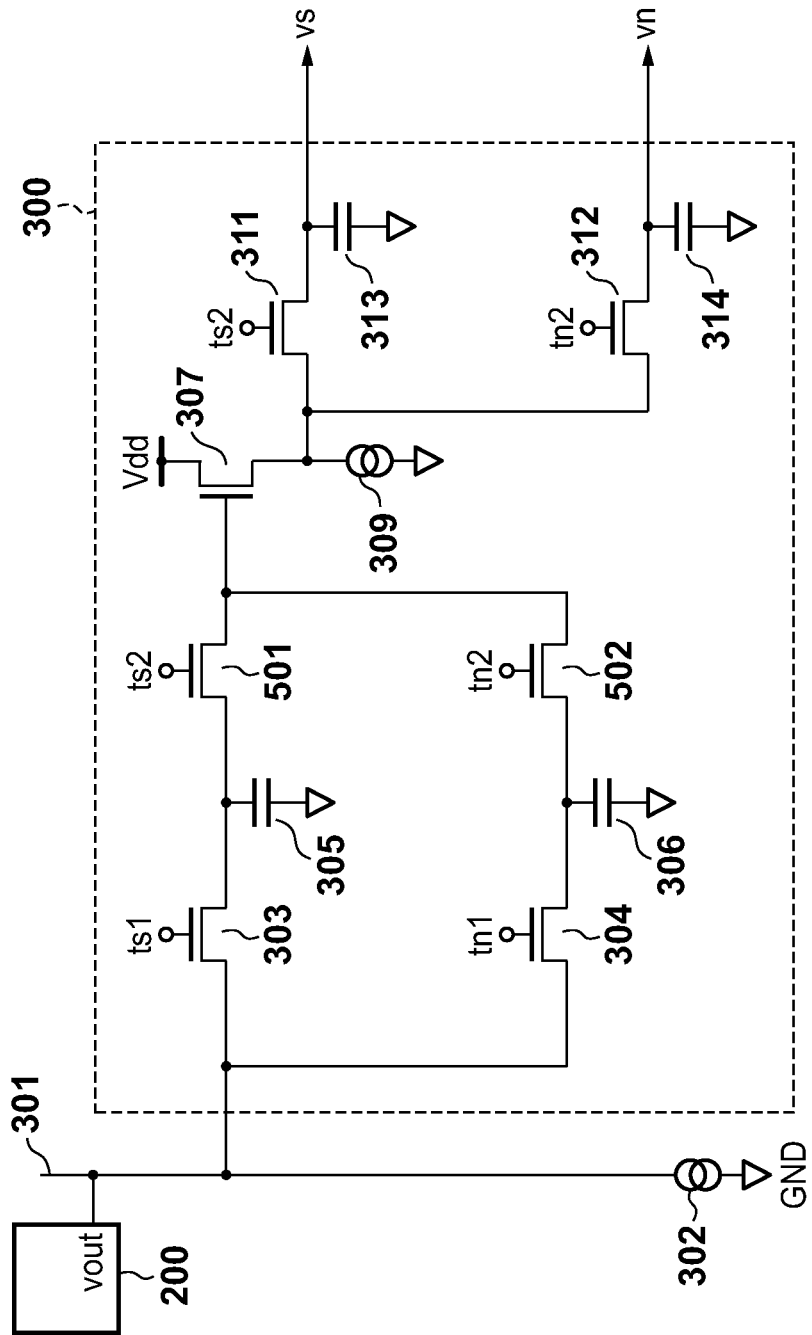
FIG. 13 is a circuit diagram showing a column common readout circuit according to the third embodiment of the present invention.

FIG. 13 shows the arrangement of the column common readout circuit 300 in this case. A third light signal transfer switch 501 is controlled by the signal ts2 common to the second light signal transfer switch 311. Also, a third noise signal transfer switch 502 is controlled by the signal tn2 common to the second noise signal transfer switch 312. Since the periods N2 and S2 are set at different timings, a source-follower circuit used to transfer a noise signal is shared by that on the light signal side, which includes the NMOS transistor 307 and current source 309. In this manner, the number of source-follower circuits in the column common readout circuit 300 can be reduced to one, thus attaining a circuit scale reduction.

Fourth Embodiment

The first to third embodiments have explained using the analog output image sensor 102. However, the present invention is also applicable to a digital output image sensor such as a column AD type. An embodiment in this case will be described below.

Figure 14:
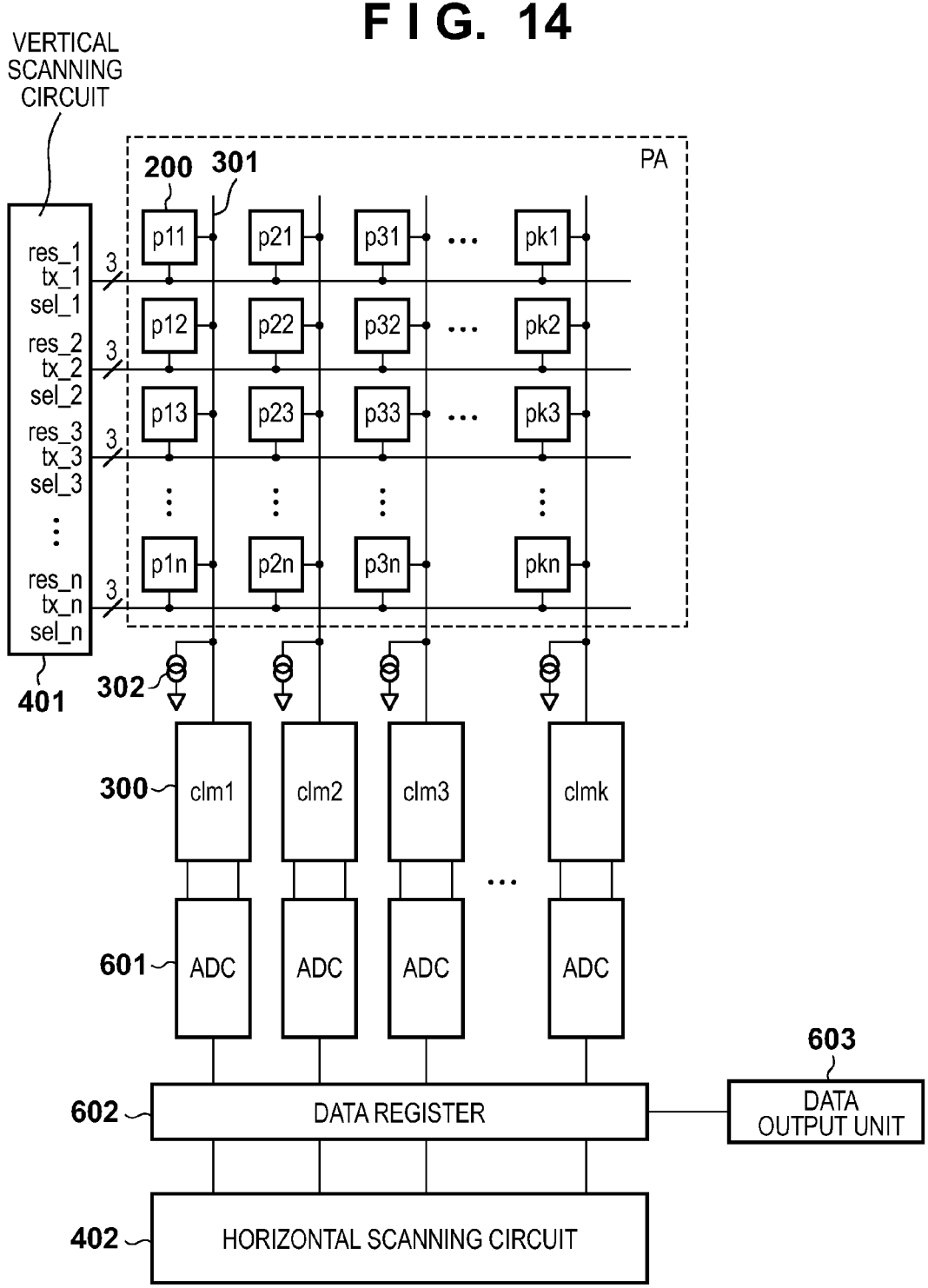
FIG. 14 is a block diagram showing the overall arrangement of an image sensor according to the fourth embodiment.

FIG. 14 shows the overall arrangement of the image sensor 102. The output terminals vs and vn of each column common readout circuit 300 are connected to inputs of an AD converter (AD conversion unit) 601 arranged for each column. The AD converter 601 analog-to-digital converts a difference between a light signal and noise signal output to the output terminals vs and vn.

A data register 602 holds output data of the AD converters 601 of respective columns. The data held in the data register 602 are sequentially transferred to a data output unit 603 by scanning of the horizontal scanning circuit 402. The data output unit 603 outputs data to the outside of the image sensor 102 by a transfer method such as LVDS.

Although not shown, when the digital output image sensor is used, the AFE is not required in the arrangement of the image sensing apparatus. That is, the image sensing apparatus adopts an arrangement by excluding the AFE 103 from FIG. 1.

Figure 15:
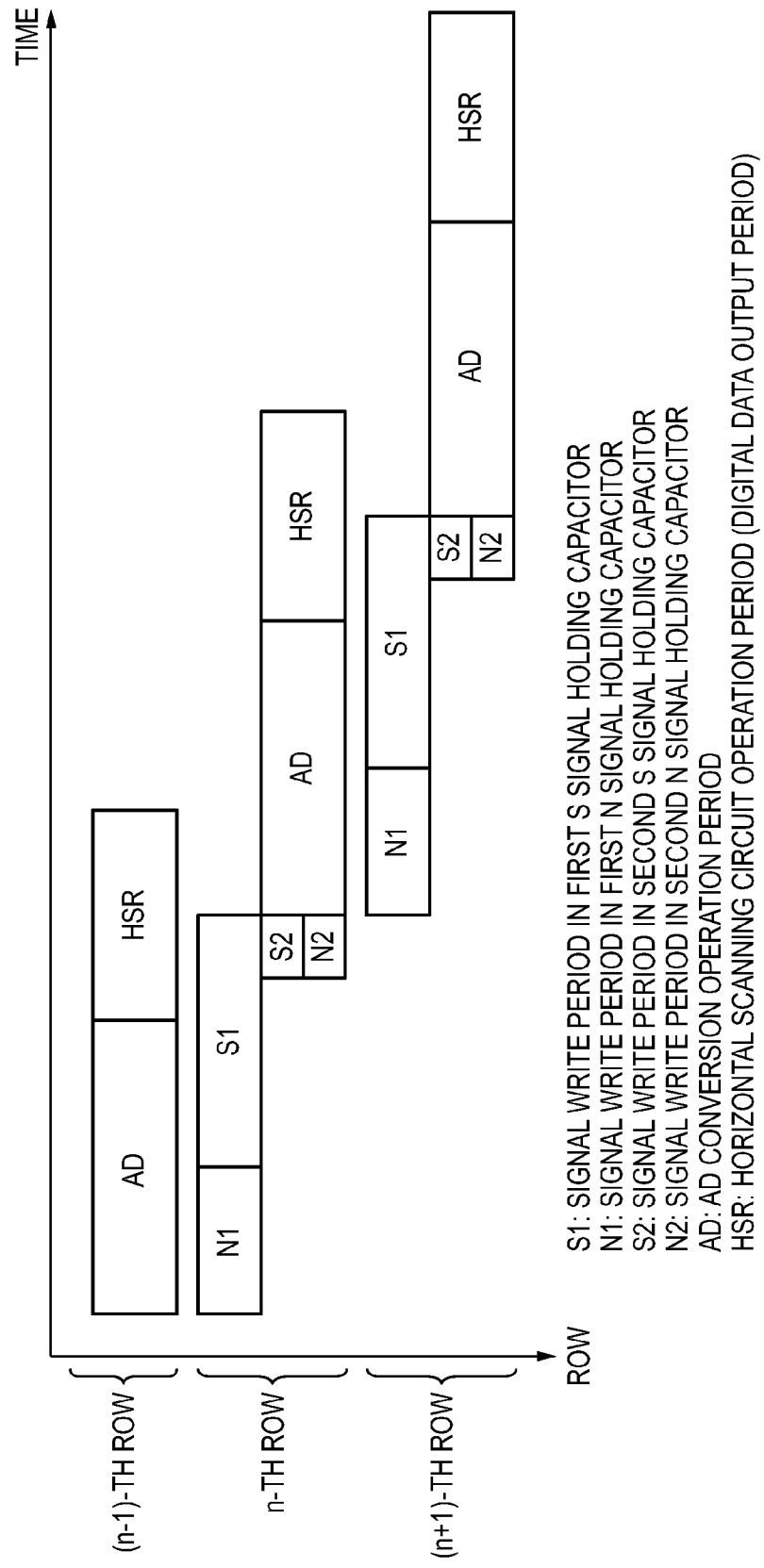
FIG. 15 is a chart showing a temporal relationship of readout operations according to the fourth embodiment of the present invention.

FIG. 15 shows a temporal relationship of readout operations in this embodiment. In a period AD, the AD converters 601 of the respective columns execute AD conversion operations for converting analog signals into digital signals. A period HSR indicates a period in which data held in the data register 602 after the AD conversion are output by scanning of the horizontal scanning circuit 402.

By executing the operations of the periods S2 and N2 during the period S1 after the end of the period AD of the previous row, the read operation efficiency can be improved.

Note that in this embodiment as well, an arrangement without any first light signal holding capacitor 305 may be adopted.

Fifth Embodiment

This embodiment will explain an application example to an image sensing apparatus using an image sensor which can acquire not only a sensed image such as a still image/moving image but also object information for focus adjustment.

Figure 16:
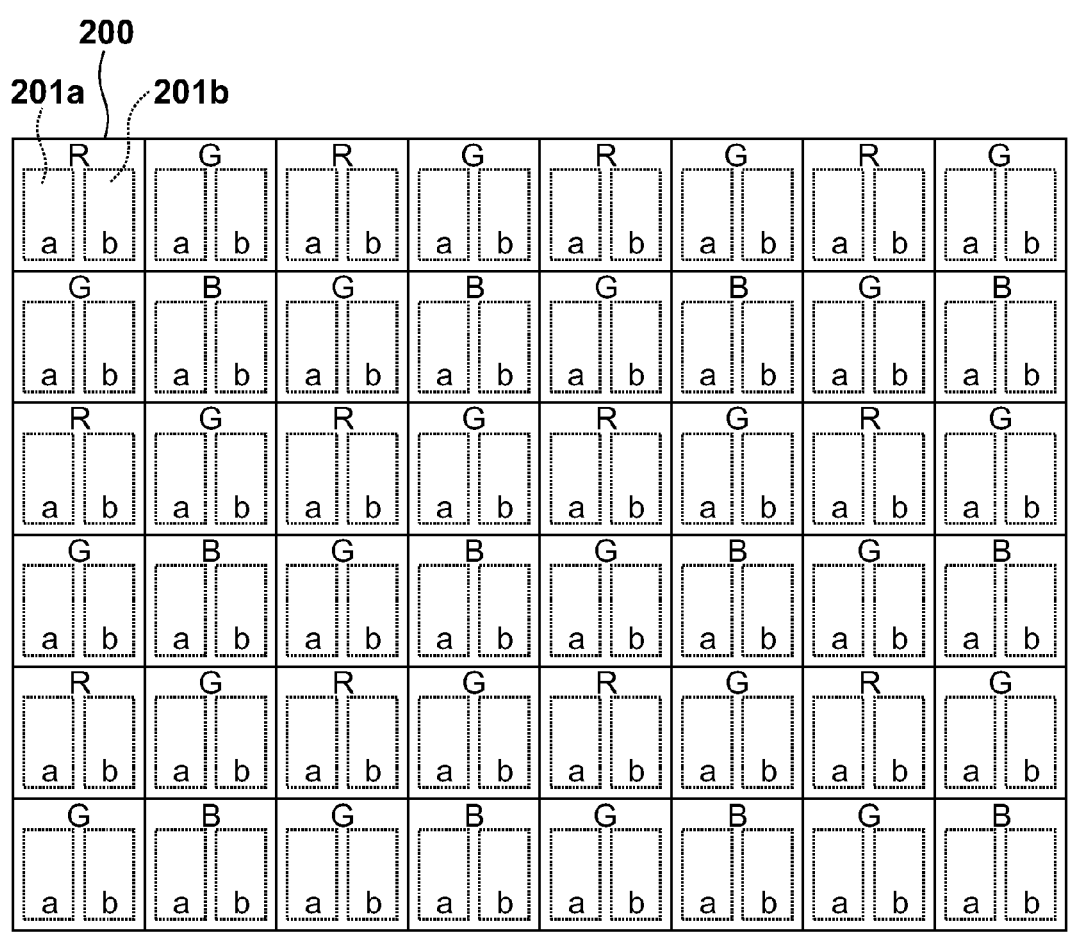
FIG. 16 is a view showing a pixel layout of an image sensor according to the fifth embodiment of the present invention.

FIG. 16 shows a pixel layout of the image sensor 102. Unit pixels 200 are arranged in matrix, and R (Red)/G (Green)/B (Blue) color filters are arranged on each pixel in a Bayer pattern. Each pixel 200 includes sub-pixels a and b, which respectively include photodiodes (to be abbreviated as PDs hereinafter) 201a and 201b. Although not shown, one microlens is arranged above each unit pixel 200. On the sub-pixels a and b, light rays which have passed through different areas of an exit pupil of an imaging lens enter via this microlens. Signals of the sub-pixels a and b are used in focus detection, and a sum signal obtained by adding the signals of the sub-pixels a and b is used in image generation.

Figure 17:
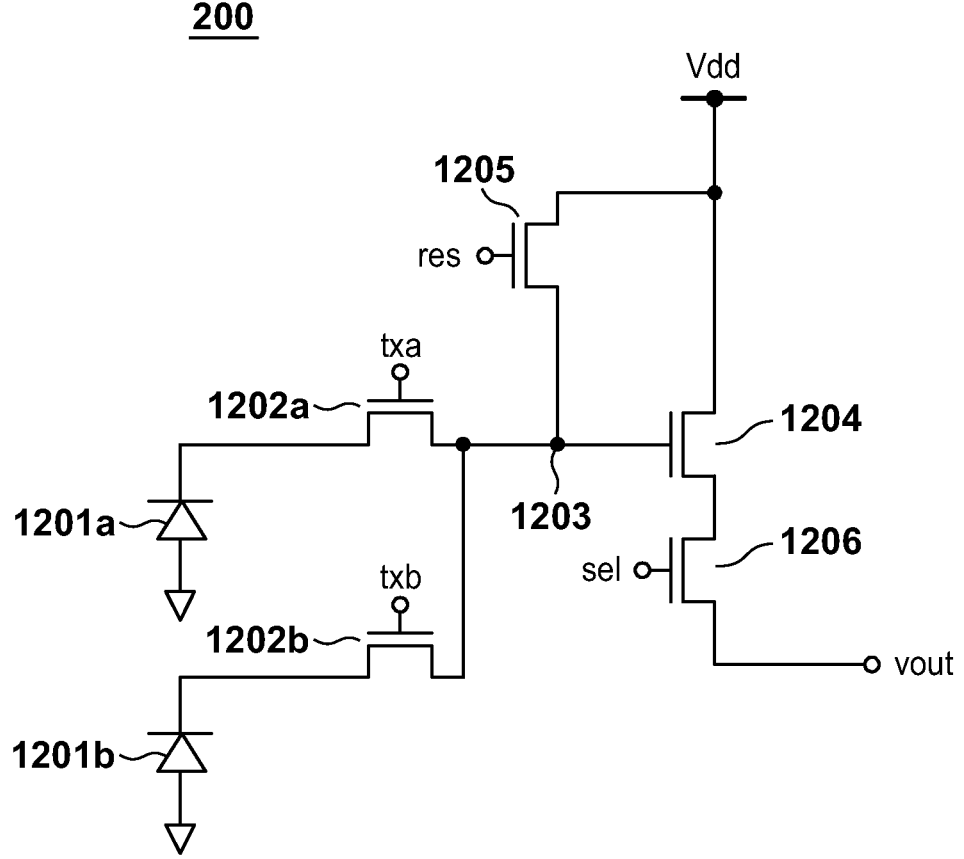
FIG. 17 is a circuit diagram showing the arrangement per pixel of a unit pixel according to the fifth embodiment of the present invention.

The arrangement per pixel of the unit pixels 200 will be described below with reference to FIG. 17. The PDs 1201a and 1201b of the aforementioned sub-pixels a and b photoelectrically convert incoming light signals, and accumulate charges according to exposure amounts. By respectively setting signals txa and txb at High level, transfer gates 1202a and 1202b are turned on, and charges accumulated on the PDs 1201a and 1201b are transferred to an FD unit 1203. The FD unit 1203 is connected to the gate of an amplifier MOS transistor 1204, and outputs a voltage signal according to the charge amounts transferred from the PDs 1201a and 1201b to the FD unit 1203.

By setting a signal res at High level, a reset switch 1205 is turned on, thus resetting the FD unit 1203. When charges on the PDs 1201a and 1201b are to be reset, the signal res and the signals txa and txb are simultaneously set at High level. Then, both of the transfer gates 1202a and 1202b and the FD reset switch 1205 are turned on, and the PDs 1201a and 1201b are reset via the FD unit 1203. A pixel selection switch 1206 is turned on by setting a signal sel at High level, and a pixel signal, which is converted into a voltage by the amplifier MOS transistor 1204, is output to an output terminal vout of the unit pixel 200.

Figure 18:
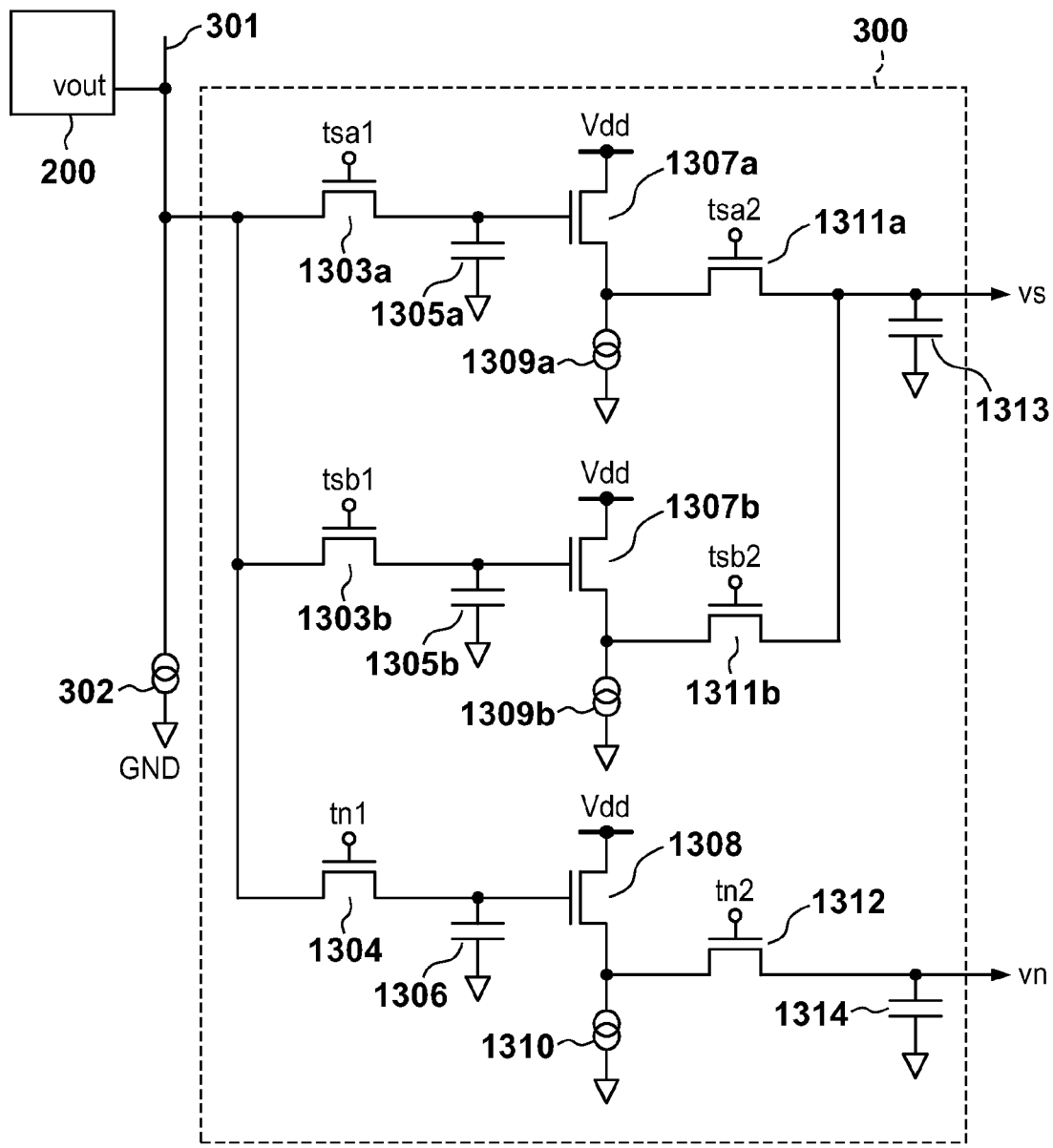
FIG. 18 is a circuit diagram showing the arrangement of a column common readout circuit according to the fifth embodiment of the present invention.

The arrangement of the column common readout circuit 300 will be described below with reference to FIG. 18. A first light signal transfer switch 1303a is used to transfer a signal of the sub-pixel a (to be referred to as signal A hereinafter) read out from the pixel 200 to a first light signal holding capacitor 1305a. By setting a signal tsa1 at High level, the first light signal transfer switch 1303a is turned on. Then, a light signal on the vertical output line 301 is stored in the first light signal holding capacitor 1305a via the first light signal transfer switch 1303a.

A first light signal transfer switch 1303b and first light signal holding capacitor 1305b have the same arrangement as the first light signal transfer switch 1303a and first light signal holding capacitor 1305a, and are used to transfer/store a sum signal of the sub-pixels a and b (to be referred to as signal AB hereinafter), as will be described later.

A first noise signal transfer switch 1304 is used to transfer a noise signal read out from the pixel 200 to a first noise signal holding capacitor 1306. By setting a signal tn1 at High level, the first noise signal transfer switch 1304 is turned on. Then, a noise signal on the vertical output line 301 is stored in the first noise signal holding capacitor 1306 via the first noise signal transfer switch 1304.

An NMOS transistor 1307a (1307b) and current source 1309a (1309b) configure a source-follower circuit. To the gate side of the NMOS transistor 1307a (1307b) as an input of the source-follower circuit, the first light signal holding capacitor 1305a (1305b) is connected. The source side of the NMOS transistor 1307a (1307b) as an output of the source-follower circuit is connected to a second light signal transfer switch 1311a (1311b).

The second light signal transfer switches 1311a and 1311b are used to transfer outputs of the respective source-follower circuits to a second light signal holding capacitor 1313. By setting a signal tsa2 (tsb2) at High level, the second light signal transfer switches 1311a and 1311b are turned on. A signal according to a signal amount held in the first light signal holding capacitor 1305a (1305b) is stored in the second light signal holding capacitor 1313 via the second light signal transfer switch 1311a (1311b).

An NMOS transistor 1308 and current source 1310 configure a source-follower circuit, and to the gate side of the NMOS transistor 1308 as an input of the source-follower circuit, the first noise signal holding capacitor 1306 is connected. The source side of the NMOS transistor 1308 as an output of the source-follower circuit is connected to a second noise signal transfer switch 1312.

The second noise signal transfer switch 1312 is used to transfer the output of the source-follower circuit to a second noise signal holding capacitor 1314. By setting a signal tn2 at High level, the second noise signal transfer switch 1312 is turned on. Then, a signal according to a signal amount held in the first noise signal holding capacitor 1306 is stored in the second noise signal holding capacitor 1314 via the second noise signal transfer switch 1312. The second light signal holding capacitor 1313 and second noise signal holding capacitor 1314 are respectively connected to the output terminals vs and vn of the column common readout circuit 300.

Readout operations of the image sensor 102 will be described below with reference to FIG. 19. Initially, a signal sel_n is set at High level to turn on the pixel selection switches 1206 of pixels of the n-th row. After that, a signal res_n is set at Low level to turn off the reset switches 1205, thus releasing a reset state of the FD units 1203.

Next, the signal tn1 is set at High level to turn on the first noise signal transfer switches 1304 to store N signals in the first noise signal holding capacitors 1306. Subsequently, the signal tn1 is set at Low level to turn off the first noise signal transfer switches 1304, and the signal tsa1 is then set at High level to turn on the first light signal transfer switches 1303a. In addition, a signal txa_n is set at High level to turn on the transfer gates 1202a.

With these operations, signals according to charges accumulated on the PDs 1201a of the selected n-th row are output onto the vertical output lines 301 via the amplifier MOS transistor 1204 and the pixel selection switches 1206. Furthermore, the signals are stored in the first light signal holding capacitors 1305a via the first light signal transfer switches 1303a.

Next, a signal txa_n is set at Low level to turn off the transfer gates 1202a, and the signal tn2 is then set at High level to turn on the second noise signal transfer switches 1312. Then, signals according to noise signals of the n-th row held in the first noise signal holding capacitors 1306 are stored in the second noise signal holding capacitors 1314.

In the same manner as the signal tn2, the signal tsa2 is also set at High level to turn on the second light signal transfer switches 1311a. At this time, the first light signal transfer switches 1303a is still ON, and signals are being written in the first light signal holding capacitors 1305a. However, light signals are simultaneously written in the second light signal holding capacitors 1313 via the source-follower circuits each including the NMOS transistor 1307a and current source 1309a and the second light signal transfer switches 1311a.

Subsequently, by the operation of the horizontal scanning circuit 402, signals in the second light signal holding capacitors 1313 and second noise signal holding capacitors 1314 are output to the output terminal 320 via the horizontal output lines 317 and 318 and the differential amplifier 319. In this manner, the signals A are read out from the image sensor 102.

Parallel to the output operations of the signals A by the horizontal scanning circuit 402, operations for reading out signals AB to the first light signal holding capacitors 1305b are executed. Initially, the signal tsb1 is set at High level to turn on the first light signal transfer switches 1303b, and a signal txb_n is set at High level to turn on the transfer gates 1202b.

With these operations, signals according to charges accumulated in the PDs 1201b of the selected n-th row are output onto the vertical signal lines 301 via the amplifier MOS transistors 1204 and pixel selection switches 1206. Furthermore, the signals are stored in the first light signal holding capacitors 1305b via the first light signal transfer switches 1303b.

Next, the signal txb_n is set at Low level to turn off the transfer gates 1202b, and the signal tsb2 is then set at High level to turn on the second light signal transfer switches 1311b. In this manner, light signals are written in the second light signal holding capacitors 1313 via the source-follower circuits each including the NMOS transistor 1307b and current source 1309b and the second light signal transfer switches 1311b. In this case, the second light signal holding capacitors 1313 store signals according to charges accumulated on the PDs 1201a of the n-th row. That is, in the second light signal holding capacitors 1313, signals corresponding to accumulated charges of the PDs 1201a and those corresponding to accumulated changes of the PDs 1201b are added to each other. Parallel to this operation, the signal tn2 is set at High level to write the noise signals of the n-th row held in the first noise signal holding capacitors 1306 in the second noise signal holding capacitor 1314 again.

After that, a signal res_n is set at High level to reset the FD units 1203, and a signal sel_n is set at Low level to end the vertical transfer operations of the n-th row.

Subsequently, by the operation of the horizontal scanning circuit 402, signals of the second light signal holding capacitors 1313 and those of the second noise signal holding capacitors 1314 are output to the output terminal 320 via the horizontal output lines 317 and 318 and the differential amplifier 319. In this manner, signals AB are read out from the image sensor 102. Parallel to the output operations of the signals AB by the horizontal scanning circuit 402, a signal sel_n+1 is set at High level to start vertical transfer operations of the (n+1)-th row.

With the aforementioned arrangement, in readout operations of the image sensor which can acquire a sensed image and object information for focus adjustment, a total readout time can be shortened.

Note that in the description of this embodiment, the write operation in the second light signal holding capacitor executed in the period S2 and that in the second noise signal holding capacitor executed in the period N2 are started during the write operation in the first light signal holding capacitor executed in the period S1 in the readout operations of both the signals A and AB. However, when the horizontal scanning operation of either the signal A or AB becomes longer than the end of the write operation in the first light signal holding capacitor, the horizontal scanning operation of the signal A or AB may start the write operation in the second light signal holding capacitor executed in the period S2 and that in the second noise signal holding capacitor executed in the period N2 after completion of the write operation in the first light signal holding capacitor executed in the period S1. FIG. 20 shows the readout operations of the image sensor 102, for example, when the horizontal scanning time of the signal A becomes longer than the write time of the signal AB in the first light signal holding capacitor. Conversely, such arrangement is applicable even to a case in which the horizontal scanning time of the signal AB becomes longer than the write time of the signal A in the first light signal holding capacitor.

This embodiment has explained the arrangement in which each vertical output line 302 and column common readout circuit 300 are directly connected. However, a variable-gain amplifier or the like may be inserted between them. In this case, a gain is changed according to an imaging condition such as an ISO speed, thus obtaining a signal with a higher S/N.

Also, the second light signal holding capacitor and second noise signal holding capacitor desirably have larger capacitances to reduce signal attenuation ratios upon transferring signals onto the horizontal output lines, thus obtaining an image with a higher S/N. For this reason, the first light signal holding capacitor and first noise signal holding capacitor tend to have smaller capacitances.

However, the second light signal holding capacitor and second noise signal holding capacitor may have smaller capacitances to shorten the write times of signals in the periods S2 and N2, thus further shortening the total readout time. For this reason, the capacitance values of the second light signal holding capacitor and second noise signal holding capacitor may be smaller than those of the first light signal holding capacitor and first noise signal holding capacitor.

Also, in the description of the embodiments, the arrangement example which switches timings in the still image mode/moving image mode. However, an application mode of the present invention is not limited to such specific example. For example, even in the moving image mode, timings may be switched between a high frame rate mode and low frame rate mode. Such arrangement is effective for the following case. That is, in the low frame rate mode, signals of a larger number of pixels are read out by spending a longer readout time to acquire a high-resolution image. In the high frame rate mode, the number of pixels to be read out from the image sensor 102 may be reduced by pixel additions and decimation.

Depending on the characteristics of the image sensor, higher image quality may be obtained by executing the write operations in the first light signal holding capacitor and second light signal holding capacitor in exclusive periods rather than when the write operation in the second light signal holding capacitor is started during the write operation in the first light signal holding capacitor. For this reason, even when signals of the same number of pixels are to be read out, the operations may be switched between the low frame rate mode and high frame rate mode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-184571, filed Aug. 23, 2012, and 2013-118307, filed Jun. 4, 2013, which are hereby incorporated by reference herein in their entirety.

What is claimed is:

1. An image sensing apparatus comprising:
an image sensor including a pixel array in which a plurality of pixels are arrayed in matrix, a first noise storage portion configured to hold a noise signal which is output from each of the pixels, a first light signal storage portion configured to hold a light signal which is output from each of the pixels, a second noise storage portion configured to hold a signal transferred from the first noise storage portion, and a second light signal storage portion configured to hold a signal transferred from the first light signal storage portion, and
a controller configured to control the image sensor so that a signal transfer from the first noise signal storage portion to the second noise signal storage portion is executed after completion of a signal write operation in the first noise signal storage portion, and a signal transfer from the first light signal storage portion to the second light signal storage portion is executed during a signal write operation in the first light signal storage portion.

2. The apparatus according to claim 1, wherein the image sensor includes a plurality of column signal lines which are arranged for each column of the pixel array, a first noise signal transfer switch configured to electrically connect between each of the column signal lines and the first noise signal storage portion, a noise signal transfer portion configured to transfer a signal in the first noise signal storage portion to the second noise signal storage portion, a second noise signal transfer switch configured to electrically connect between the noise signal transfer portion and the second noise signal storage portion, a first light signal transfer switch configured to electrically connect between each of the column signal lines and the first light signal storage portion, a light signal transfer portion configured to transfer a signal in the first light signal storage portion to the second light signal storage portion, and a second light signal transfer switch configured to electrically connect between the light signal transfer portion and the second light signal storage portion,
wherein the signal write operation in the first noise signal storage portion is executed by turning on the first noise signal transfer switch, the signal write operation in the first light signal storage portion is executed by turning on the first light signal transfer switch in a closed state, the signal transfer to the second noise signal storage portion is executed by turning on the second noise signal transfer switch, and the signal transfer to the second light signal storage portion is executed by turning on the second light signal transfer switch.

3. The apparatus according to claim 1, wherein the controller controls so that completion of the signal write operation in the first light signal storage portion and completion of the signal transfer to the second light signal storage portion are simultaneously attained.

4. The apparatus according to claim 1, wherein the controller controls so that the signal write operation in the first light signal storage portion is completed before completion of the signal transfer to the second light signal storage portion.

5. The apparatus according to claim 1, wherein the controller controls so that the signal transfer to the second light signal storage portion is completed before completion of the signal write operation in the first light signal storage portion.

6. The apparatus according to claim 1, further comprising setting portion configured to set one of a first imaging mode and a second imaging mode in which a signal readout period from the second storage portion is shorter than the first imaging mode, wherein in the first imaging mode, the signal transfer to the second storage portion is executed after completion of the signal write operation in the first storage portion, and in the second imaging mode, the signal transfer to the second storage portion is executed during the signal write operation in the first storage portion.

7. The apparatus according to claim 1, wherein said image sensor further includes an AD conversion portion which is arranged for each column and is configured to AD-convert a signal read out from the second storage portion.

8. The apparatus according to claim 1, wherein in each of the plurality of pixels, a plurality of sub-pixels are arranged.

9. The apparatus according to claim 8, wherein signals output from the plurality of sub-pixels are used in focus detection.

10. An image sensing apparatus comprising:
an image sensor including a pixel array in which a plurality of pixels are arrayed in matrix, a first noise signal storage portion configured to hold a noise signal from the pixel, a first light signal storage portion configured to hold a light signal output from the pixel, a second noise signal storage portion configured to hold a signal transferred from the first noise storage portion, and a second light signal storage portion configured to hold a signal transferred from the first light signal storage portion,
wherein transfer from the first noise signal storage portion to the second noise signal storage portion is executed after completion of a signal write operation in the first noise signal storage portion, and transfer from the first light signal storage portion to the second light signal storage portion is executed during a signal write operation in the first light signal storage portion.

11. The apparatus according to claim 10, wherein the pixel is connected to a column signal line arranged for each column, and the image sensor includes a first noise signal transfer switch configured to open/close a connection between the column signal line and the first noise signal storage portion, a first light signal transfer switch configured to open/close a connection between the column signal line and the first light signal storage portion, a noise signal transfer portion configured to transfer a signal in the first noise signal storage portion to the second noise signal storage portion, a light signal transfer portion configured to transfer a signal in the first light signal storage portion to the second light signal storage portion, a second noises signal transfer switch configured to open/close a connection between the noise signal transfer portion and the second noise signal storage portion, and a second light signal transfer switch configured to open/close a connection between the light signal transfer portion and the second light signal storage portion,
a signal write operation in the first noise signal storage portion is executed by setting the first noise signal transfer switch in a closed state,
a signal write operation in the first light signal storage portion is executed by setting the first light signal transfer switch in a closed state,
signal transfer to the second noise signal storage portion is executed by setting the second noise signal transfer switch in a closed state, and
signal transfer to the second light signal storage portion is executed by setting the second light signal transfer switch in a closed state.

12. The apparatus according to claim 10, wherein the pixel is connected to a column signal line arranged for each column, and the image sensor includes a first noise signal transfer switch configured to open/close a connection between the column signal line and the first noise signal storage portion, a first light signal transfer switch configured to open/close a connection between the column signal line and the first light signal storage portion, a transfer portion configured to respectively transfer signals in the first noise signal storage portion and the first light signal storage portion to the second noise signal storage portion and the second light signal storage portion, a second noises signal transfer switch configured to open/close a connection between the transfer portion and the second noise signal storage portion, a second light signal transfer switch configured to open/close a connection between the transfer portion and the second light signal storage portion, a third noise signal transfer switch configured to open/close a connection between the second noise signal storage portion and the transfer portion, and a third light signal transfer switch configured to open/close a connection between the second light signal storage portion and the transfer portion,
a signal write operation in the first noise signal storage portion is executed by setting the first noise signal transfer switch in a closed state,
a signal write operation in the first light signal storage portion is executed by setting the first light signal transfer switch in a closed state,
signal transfer to the second noise signal storage portion is executed by setting the second noise signal transfer switch and the third noise signal transfer switch in a closed state, and
signal transfer to the second light signal storage portion is executed by setting the second light signal transfer switch and the third light signal transfer switch in a closed state.

13. The apparatus according to claim 10, wherein completion of the signal write operation in the first light signal storage portion by setting the first light signal transfer switch in an open state and completion of the signal transfer to the second light signal storage portion by setting the second light signal transfer switch in an open state are simultaneously attained.

14. The apparatus according to claim 10, wherein the signal write operation in the first light signal storage portion is completed by setting the first light signal transfer switch in an open state before completion of the signal transfer to the second light signal storage portion by setting the second light signal transfer switch in an open state.

15. The apparatus according to claim 10, wherein the signal transfer to the second light signal storage portion is completed by setting the second light signal transfer switch in an open state before completion of the signal write operation in the first light signal storage portion by setting the first light signal transfer switch in an open state.

16. The apparatus according to claim 10, further comprising setting portion configured to set one of a first imaging mode and a second imaging mode in which signal readout periods from the second noise signal storage portion and the second light signal storage portion are shorter than the first imaging mode,
wherein in the first imaging mode, the signal transfer to the second light signal storage portion is executed after completion of the signal write operation in the first light signal storage portion, and in the second imaging mode, the signal transfer to the second light signal storage portion is executed during the signal write operation in the first light signal storage portion.

17. The apparatus according to claim 10, further comprising an AD conversion portion which is arranged for each column, and is configured to AD-convert a signal read out from the second light signal storage portion or the second noise signal storage portion.

18. The apparatus according to claim 10, wherein in each of the plurality of pixels, a plurality of sub-pixels are arranged.

19. The apparatus according to claim 18, wherein signals output from the plurality of sub-pixels are used in focus detection.

20. An image sensing apparatus comprising:
an image sensor including a pixel array in which a plurality of pixels are arrayed in matrix, a light signal storage portion configured to hold a light signal output from the pixel, a first noise signal storage portion configured to hold a noise signal output from the pixel, and a second noise signal storage portion configured to hold a signal transferred from the first noise signal storage portion,
wherein transfer from the first noise signal storage portion to the second noise signal storage portion is executed during a signal write operation in the light signal storage portion after completion of a signal write operation in the first noise signal storage portion.

* * * * *